United States Patent
Kojima et al.

(10) Patent No.: US 9,269,954 B2
(45) Date of Patent: Feb. 23, 2016

(54) PRODUCTION PROCESS FOR LITHIUM-SILICATE-SYSTEM COMPOUND

(75) Inventors: Toshikatsu Kojima, Ikeda (JP); Tetsuo Sakai, Ikeda (JP); Takuhiro Miyuki, Ikeda (JP); Yasue Okuyama, Ikeda (JP); Akira Kojima, Kariya (JP); Junichi Niwa, Kariya (JP); Hitotoshi Murase, Kariya (JP)

(73) Assignees: NATIONAL INSTITUTE OF ADVANCED INDUSTRIAL SCIENCE AND TECHNOLOGY, Tokyo (JP); KABUSHIKI KAISHA TOYOTA JIDOSHOKKI, Aichi (JP)

( * ) Notice: Subject to any disclaimer, the term of this patent is extended or adjusted under 35 U.S.C. 154(b) by 1198 days.

(21) Appl. No.: 13/147,747

(22) PCT Filed: Nov. 20, 2009

(86) PCT No.: PCT/JP2009/069694
§ 371 (c)(1),
(2), (4) Date: Aug. 3, 2011

(87) PCT Pub. No.: WO2010/089931
PCT Pub. Date: Aug. 12, 2010

(65) Prior Publication Data
US 2011/0291055 A1  Dec. 1, 2011

(30) Foreign Application Priority Data

Feb. 4, 2009 (JP) .................................. 2009-023570

(51) Int. Cl.
*H01B 1/06* (2006.01)
*H01M 4/88* (2006.01)
(Continued)

(52) U.S. Cl.
CPC ............. *H01M 4/5825* (2013.01); *C01B 33/32* (2013.01); *H01M 10/052* (2013.01); *Y02E 60/122* (2013.01); *Y02P 70/54* (2015.11)

(58) Field of Classification Search
None
See application file for complete search history.

(56) References Cited

U.S. PATENT DOCUMENTS 7,041,239 B2 * 5/2006 Barker et al. .............. 252/521.5
8,349,217 B2 * 1/2013 Yamada et al. ............... 252/500

(Continued)

FOREIGN PATENT DOCUMENTS

CN     1803608 A    7/2006
EP   1 134 826 A1   9/2001

(Continued)

OTHER PUBLICATIONS

Chinese Office Action for corresponding CN Patent Application No. 200980156052.5 issued on Mar. 26, 2013.

*Primary Examiner* — Mark Kopec
*Assistant Examiner* — Jaison Thomas
(74) *Attorney, Agent, or Firm* — Sughrue Mion, PLLC

(57) ABSTRACT

The present invention is one which provides a production process for lithium-silicate-system compound, the production process being characterized in that: a lithium-silicate compound being expressed by $Li_2SiO_3$ is reacted with a substance including at least one member of transition-metal elements that is selected from the group consisting of iron and manganese at 400-650° C. in a molten salt of a carbonate mixture comprising lithium carbonate and at least one member of alkali-metal carbonates that is selected from the group consisting of potassium carbonate, sodium carbonate, rubidium carbonate and cesium carbonate in a mixed-gas atmosphere including carbon dioxide and a reducing gas; and a positive-electrode active material for lithium-ion secondary battery that comprises a lithium-silicate-system compound being obtained by the aforesaid process.

29 Claims, 3 Drawing Sheets

(51) Int. Cl.
*H01M 4/58* (2010.01)
*C01B 33/32* (2006.01)
*H01M 10/052* (2010.01)

(56) References Cited

U.S. PATENT DOCUMENTS

2007/0141468 A1* 6/2007 Barker ................ 429/231.1
2008/0081258 A1   4/2008 Kim et al.
2012/0205595 A1* 8/2012 Schulz-Dobrick et al. ... 252/507
2014/0231721 A1* 8/2014 Kojima et al. ............. 252/506

FOREIGN PATENT DOCUMENTS

| | | |
|---|---|---|
| JP | 63-185811 A | 8/1988 |
| JP | 10154510 A | 6/1998 |
| JP | 2001-192210 A | 7/2001 |
| JP | 2001-266882 A | 9/2001 |
| JP | 2007-335325 A | 12/2007 |
| JP | 2008-218303 A | 9/2008 |
| JP | 2008-293661 A | 12/2008 |

* cited by examiner

PRODUCTION PROCESS FOR LITHIUM-SILICATE-SYSTEM COMPOUND

CROSS REFERENCE TO RELATED APPLICATIONS

This application is a National Stage of International Application No. PCT/JP2009/069694 filed on Nov. 20, 2009, which claims priority from Japanese Patent Application No. 2009-023570, filed on Feb. 4, 2009, the contents of all of which are incorporated herein by reference in their entirety.

TECHNICAL FIELD

The present invention relates to a production process for lithium-silicate-system compound, which is useful as the positive-electrode active materials of lithium-ion batteries, and the like, and to uses or applications for the lithium-silicate-system compound that is obtainable by this process.

BACKGROUND ART

Lithium secondary batteries have been used widely as power sources for portable electronic instruments, because they are small-sized and have high energy densities. As for their positive-electrode active materials, lamellar compounds, such as $LiCoO_2$, have been employed mainly. However, these compounds have such a problematic issue that the oxygen is likely to be eliminated before and after 150° C. under the fully-charged conditions so that this is likely to cause the oxidative exothermic reactions of nonaqueous electrolyte liquids.

Recently, as for positive-electrode active material, olivine-type phosphate compounds, Li"M"PO$_4$ ($LiMnPO_4$, $LiFePO_4$, $LiCoPO_4$, and the like), have been proposed. These compounds upgrade the thermal stabilities by means of using the divalent/trivalent oxidation-reduction reaction, instead of the trivalent/tetravalent oxidation-reduction in which an oxide like $LiCoO_2$ serves as a positive-electrode active material; and have been attracting attention as compounds from which higher discharging voltages are available by means of arranging the polyanions of hetero elements whose electronegativities are higher around the central metal.

However, in a positive-electrode material comprising an olivine-type phosphate compounds, its theoretical capacity is limited to 170 mAh/g approximately because of the large molecular weight of phosphate polyanions. Furthermore, $LiCoPO_4$ and $LiNiPO_4$ have such a problem that no electrolytic liquids, which can withstand their charging voltages, are available because the operating voltages are too high.

Hence, as a cathode material that is inexpensive, which is more abundant in the amount of resource, which is lower in the environmental load, which has a higher theoretical charging-discharging capacity of lithium ion, and which does not release any oxygen at the time of high temperature, lithium-silicate-system materials, such as $Li_2FeSiO_4$ (with 331.3-mAh/g theoretical capacity) and $Li_2MnSiO_4$ (with 333.2-mAh/g theoretical capacity), have been attracting attention. These silicate-system materials are expected as positive-electrode materials for lithium secondary batteries with much higher capacities. In addition, their charging voltages are lower than those of phosphate-system ones by about 0.6 V approximately, which is a reflection of the fact that the electronegativity of Si, a hetero element, is smaller than that of P, and there is such a possibility that Co and Ni are employable as a doping element to the silicates.

Of these silicate materials, $Li_2FeSiO_4$ is a material showing the highest charging-discharging characteristic ever that has been reported at present. Although $Li_2FeSiO_4$ exhibits a capacity of 160 mAh/g approximately, it has not yet arrived at obtaining a charging-discharging characteristic that exceeds 169.9 mAh/g, the theoretical capacity of $LiFePO_4$ that is one of the current materials.

As for synthesizing methods for the aforementioned silicate-system compounds, the hydrothermal synthesis method, and the solid-phase reaction method have been known. Of these methods, although it is feasible to obtain fine particles with particle diameters of from 1 to 10 nm approximately by means of the hydrothermal synthesis method, there is such a problem that doping elements are less likely to dissolve and so the phases of impurities are likely to be present mixedly.

Meanwhile, in the solid-phase reaction method, although it is feasible to dissolve doping elements because it is needed to cause reactions at such high temperatures as 1,000° C. or more for a long period of time, the resulting crystal grains become larger to 10 μm or more, thereby leading to such a problem that the diffusion of ions is slow. Besides, since the reactions are caused at the high temperatures, the doping elements, which have not dissolved completely, precipitate to generate impurities in the cooling process, and so there is such a problem that the resultant resistance becomes higher. In addition, since lithium-deficient or oxygen-deficient silicate-system compounds have been made due to the heating being done up to the high temperatures, there is also such a problem that it is difficult to increase capacities or to upgrade cyclic characteristics (see following Patent Literature Nos. 1 through 4).

PRIOR TECHNICAL LITERATURE

Patent Literature

Patent Literature No. 1: Japanese Unexamined Patent Publication (KOKAI) Gazette No. 2008-218,303;
Patent Literature No. 2: Japanese Unexamined Patent Publication (KOKAI) Gazette No. 2007-335,325;
Patent Literature No. 3: Japanese Unexamined Patent Publication (KOKAI) Gazette No. 2001-266,882; and
Patent Literature No. 4: Japanese Unexamined Patent Publication (KOKAI) Gazette No. 2008-293,661

SUMMARY OF THE INVENTION

Assignment to be Solved by the Invention

The present invention is one which has been done in view of the current situations of the aforementioned conventional technologies. Its major objective is to provide a process with regard to lithium-silicate-system material that is useful as a positive-electrode active material for lithium-ion secondary battery, and the like, the process being capable of producing materials whose cyclic characteristics, capacities, and so forth, are improved to have superior performance, by means of relatively simple and easy means.

Means for Solving the Assignment

The present inventors had been studying earnestly to achieve the aforementioned object repeatedly. As a result, they found out that, in accordance with a method of reacting $Li_2SiO_3$ with a substance including at least one transition-metal element that is selected from the group consisting of iron and manganese in a molten salt of a mixture of lithium carbonate and the other alkali-metal carbonate in a mixed-gas atmosphere of a reducing gas and carbon dioxide, it is possible to obtain a lithium-silicate-system compound including iron or manganese under relatively mild conditions. And, they found out that the obtained lithium-silicate-system compound turns into a silicate-system compound that is fine, and which has impurity phases less but includes lithium atoms excessively, and that it becomes a material whose cyclic characteristics are favorable, and which has a high capacity, in a case of being used as a positive-electrode active material for lithium-ion secondary battery. And then, they arrived at completing the present invention herein.

Specifically, the present invention is one which provides the following production processes for lithium-silicate-system compound, lithium-silicate-system compounds being obtained by these processes, and their intended uses or applications.

1. A production process for lithium-silicate-system compound, the production process being characterized in that:

a lithium-silicate compound being expressed by $Li_2SiO_3$ is reacted with a substance including at least one member of transition-metal elements that is selected from the group consisting of iron and manganese at 400-650° C. in a molten salt of a carbonate mixture comprising lithium carbonate and at least one member of alkali-metal carbonates that is selected from the group consisting of potassium carbonate, sodium carbonate, rubidium carbonate and cesium carbonate in a mixed-gas atmosphere including carbon dioxide and a reducing gas.

2. The production process as set forth in aforementioned article No. 1, wherein the substance including transition-metal element is one which includes:

at least one member of transition-metal elements that is selected from the group consisting of iron and manganese in an amount of from 50 to 100% by mol; and at least one member of other transition-metal elements that is selected from the group consisting of Mg, Ca, Co, Al, Ni, Nb, Ti, Cr, Cu, Zn, Zr, V, Mo and W in an amount of from 0 to 50% by mol;

when a summed amount of the transition-metal elements is taken as 100% by mol.

3. A production process for lithium-silicate-system compound, the production process including a step of removing the alkali-metal carbonate, which is used as a flux, by means of a solvent, after producing a lithium-silicate-system compound by the process according to aforementioned article No. 1 or 2.

4. The production process as set forth in either one of aforementioned article Nos. 1 through 3, wherein a lithium-silicate-system compound to be formed is a compound being expressed by a compositional formula:

$$Li_{2+a-b}A_bM_{1-x}M'_xSiO_{4+c}:$$

where "A" is at least one element that is selected from the group consisting of Na, K, Rb and Cs;

"M" is at least one element that is selected from the group consisting of Fe and Mn;

"M'" is at least one element that is selected from the group consisting of Mg, Ca, Co, Al, Ni, Nb, Ti, Cr, Cu, Zn, Zr, V, Mo and W; and the respective subscripts are specified as follows:
$0 \leq x \leq 0.5$;
$0 < a < 1$;
$0 \leq b < 0.2$; and
$0 < c < 0.3$;
in the formula.

5. A production process for lithium-silicate-system compound whose electrical conductivity is upgraded, the production process being characterized in that:

a heat treatment is carried out in a reducing atmosphere after adding a carbonaceous material and $Li_2CO_3$ to a lithium-silicate-system compound being obtained by the process according to either one of aforementioned article Nos. 1 through 4 and then mixing them by means of ball mill until they turn into being amorphous.

6. A production process for fluorine-containing lithium-silicate-system compound that is expressed by a compositional formula:

$$Li_{2+a-b}A_bM_{1-x}M'_xSiO_{4+c-y}F_{2y}:$$

where "A" is at least one element that is selected from the group consisting of Na, K, Rb and Cs;

"M" is Fe or Mn;

"M'" is at least one element that is selected from the group consisting of Mg, Ca, Co, Al, Ni, Nb, Ti, Cr, Cu, Zn, Zr, V, Mo and W; and the respective subscripts are specified as follows:
$0 \leq x \leq 0.5$;
$0 < a < 1$;
$0 \leq b < 0.2$;
$0 < c < 0.3$; and
$0 < y < 1$;
in the formula;

the production process being characterized in that:

a heat treatment is carried out in a reducing atmosphere after adding a carbonaceous material and LiF to a lithium-silicate-system compound being obtained by the process according to either one of aforementioned article Nos. 1 through 4 and then mixing them by means of ball mill until they turn into being amorphous.

7. A positive-electrode active material for lithium-ion secondary battery, the positive-electrode active material comprising a lithium-silicate-system compound that is obtained by means of the process according to either one of aforementioned article Nos. 1 through 6.

8. A positive-electrode active material for lithium-ion secondary battery, the positive-electrode active material comprising a lithium-silicate-system compound that is obtainable by carrying out charging with use of a lithium-silicate-system compound that is obtained by means of the process according to either one of aforementioned article Nos. 1 through 6 as a positive-electrode active material for lithium-ion secondary battery.

9. An active material for lithium-ion secondary battery making the positive-electrode active material for lithium-ion secondary battery as set forth in aforementioned article No. 8, wherein the lithium-silicate-system compound that is obtainable by carrying out charging is a compound under a condition of being charged up to 4.2 V when lithium metal serves as a negative electrode, the compound being expressed by a compositional formula:

$$Li_{1+a-b}A_bFeSiO_{4+c}:$$

where "A" is at least one element that is selected from the group consisting of Na, K, Rb and Cs; and the respective subscripts are specified as follows:
$0 < "a" < 1$;
$0 \leq "b" < 0.2$; and
$0 < "c" < 0.3$;
in the formula; and the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 10.10 degrees;
the second peak at and around 16.06 degrees;
the third peak at and around 9.8 degrees;
the fourth peak at and around 14.54 degrees; and
the fifth peak at and around 15.50 degrees.

10. An active material for lithium-ion secondary battery making the positive-electrode active material for lithium-ion secondary battery as set forth in aforementioned article No. 8, wherein the lithium-silicate-system compound that is obtainable by carrying out charging is a compound under a condition of being charged up to 4.2 V when lithium metal serves as a negative electrode, the compound being expressed by a compositional formula:

$$Li_{1+a-b}A_bMnSiO_{4+c}:$$

where "A" is at least one element that is selected from the group consisting of Na, K, Rb and Cs; and
the respective subscripts are specified as follows:
$0<"a"<1$;
$0\leq"b"<0.2$; and
$0<"c"<0.3$;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 8.15-degree diffraction angle;
the second peak at and around 11.60-degree diffraction angle;
the third peak at and around 17.17-degree diffraction angle;
the fourth peak at and around 11.04-degree diffraction angle; and
the fifth peak at and around 19.87-degree diffraction angle.

11. A positive-electrode active material for lithium-ion secondary battery, the positive-electrode active material comprising a lithium-silicate-system compound that is obtainable by doing discharging after doing charging with use of a lithium-silicate-system compound that is obtained by means of the process according to either one of aforementioned article Nos. 1 through 6 as a positive-electrode active material for lithium-ion secondary battery.

12. The positive-electrode active material for lithium-ion secondary battery as set forth in aforementioned article No. 11, wherein the lithium-silicate-system compound that is obtainable by doing discharging is a compound under a condition of being discharged down to 1.5 V when lithium metal serves as a negative electrode, the compound being expressed by a compositional formula:

$$Li_{2+a-b}A_bFeSiO_{4+c}:$$

where "A" is at least one element that is selected from the group consisting of Na, K, Rb and Cs; and
the respective subscripts are specified as follows:
$0<"a"<1$;
$0\leq"b"<0.2$; and
$0<"c"<0.3$;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 16.07-degree diffraction angle;
the second peak at and around 14.92-degree diffraction angle;
the third peak at and around 10.30-degree diffraction angle;
the fourth peak at and around 9.82-degree diffraction angle; and
the fifth peak at and around 21.98-degree diffraction angle.

13. The positive-electrode active material for lithium-ion secondary battery as set forth in aforementioned article No. 11, wherein the lithium-silicate-system compound that is obtainable by doing discharging is a compound under a condition of being discharged down to 1.5 V when lithium metal serves as a negative electrode, the compound being expressed by a compositional formula:

$$Li_{2+a-b}A_bMnSiO_{4+c}:$$

where "A" is at least one element that is selected from the group consisting of Na, K, Rb and Cs; and
the respective subscripts are specified as follows:
$0<"a"<1$;
$0\leq"b"<0.2$; and
$0<"c"<0.3$;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 8.16-degree diffraction angle;
the second peak at and around 11.53-degree diffraction angle;
the third peak at and around 11.66-degree diffraction angle;
the fourth peak at and around 11.03-degree diffraction angle; and
the fifth peak at and around 11.35-degree diffraction angle.

14. A positive electrode for lithium secondary battery, the positive electrode including a lithium-silicate-system compound that is obtained by means of the process according to either one of aforementioned article Nos. 1 through 6 as an active material.

15. A lithium secondary battery including the positive electrode as set forth in aforementioned article No. 14 as a constituent element.

Hereinafter, explanations will be made in detail on a production process for lithium-silicate-system compound according to the present invention.

Composition of Molten Salt

In a production process for lithium-silicate-system compound according to the present invention, it is necessary to carry out a synthesizing reaction for lithium-silicate-system compound in a molten salt of a carbonate mixture comprising lithium carbonate ($Li_2CO_3$), and at least one member of alkali-metal carbonates that is selected from the group consisting of potassium carbonate ($K_2CO_3$), sodium carbonate ($Na_2CO_3$), rubidium carbonate ($Rb_2CO_3$) and cesium carbonate ($Cs_2CO_3$). Although the molten temperature is 700° C. approximately when using lithium carbonate independently, it is possible to establish a molten temperature that falls down below 650° C. when a mixture of lithium carbonate and the other alkali-metal carbonate serves as a molten salt, and hence it becomes feasible to synthesize a targeted lithiumsilicate-system compound at such a relatively low reaction temperature of from 400 to 650° C. As a result, the granular growth can be inhibited at the time of synthesizing lithium silicate, and so fine lithium-silicate-system compounds can be formed. Moreover, in a case of causing reactions in a molten salt of the carbonate mixture under the aforementioned condition, the formation of impurity phases is less, and besides lithium-silicate-system compounds that include lithium atoms excessively can be formed, due to the fact that lithium carbonate is included in the carbonate mixture. Lithium-silicate-system compounds that are obtainable in this manner make positive-electrode materials for lithium-ion battery that has favorable cyclic characteristics and high capacity.

It is advisable to set a mixing proportion of lithium carbonate and that of at least one member of alkali-metal carbonates that is selected from the group consisting of potassium carbonate, sodium carbonate, rubidium carbonate and cesium carbonate so that the molten temperature of a molten salt to be formed can be a temperature that falls down below 650° C. As to the ratio of lithium carbonate in the carbonate mixture, although it is not restrictive particularly, it is usually preferable to be 30% by mol or more, or to fall in a range of from 30 to 70% by mol especially, when taking the total number of moles in the aforesaid carbonate mixture as the standard.

As for an example of the aforesaid carbonate mixture, it is possible to give a mixture that comprises lithium carbonate in an amount of from 30 to 70% by mol, sodium carbonate in an amount of from 0 to 60% by mol, and potassium carbonate in an amount of from 0 to 50% by mol. As for preferable examples of such a carbonate mixture, it is possible to give the following: a mixture that comprises lithium carbonate in an amount of from 40 to 45% by mol, sodium carbonate in an amount of from 30 to 35% by mol, and potassium carbonate in an amount of from 20 to 30% by mol; a mixture that comprises lithium carbonate in an amount of from 50 to 55% by mol, and sodium carbonate in an amount of from 45 to 50% by mol; a mixture that comprises lithium carbonate in an amount of from 60 to 65% by mol, and potassium carbonate in an amount of from 35 to 40% by mol, and the like.

Raw-Material Compound

In the present invention, a lithium-silicate compound being expressed by $Li_2SiO_3$, and a substance including at least one member of transition-metal elements that is selected from the group consisting of iron and manganese, are used as for the raw materials.

As to the substance including iron, and as to the substance including manganese, they are not restrictive particularly, and so it is possible to use the following: iron in metallic state; manganese in metallic state; compounds including iron with valency up to divalence; compounds including manganese with valency up to divalence; and the like. In particular, it is preferable to use oxalate, such as iron oxalate or manganese oxalate, in order that the state of divalent iron or divalent manganese is likely to be maintained. It is possible to use either one of the substance including iron and the substance including manganese, or to mix the two to use.

In the present invention, although the aforementioned substance including at least one member of transition-metal elements that is selected from the group consisting of iron and manganese is indispensable, it is possible to further use a substance including another transition-metal element, if needed. As for the substance including another transition-metal element, it is possible to exemplify a substance including at least one member of transition-metal elements that is selected from the group consisting of Mg, Ca, Co, Al, Ni, Nb, Ti, Cr, Cu, Zn, Zr, V, Mo and W. It is even allowable that substances including these transition-metal elements can be transition-metal elements in metallic states. Alternatively, it is also permissible that they can be compounds including transition-metal elements with valency up to divalence, such as sulfates, carbonates and hydroxides, for instance. It is even allowable that the substance including another transition-metal element can be a substance that includes one species of the other transition-metal elements only. Alternatively, it is even permissible that it can be a substance that includes two or more species of the other transition-metal elements simultaneously. It is possible to use one species of the substances including the other transition-metal elements independently, or to mix two or more species of them to use.

In the substances including transition-metal elements, it is necessary that, when a summed amount of transition-metal elements is taken as 100% by mol, at least one member of transition-metal elements that is selected from the group consisting of iron and manganese is present so that at least one member of transition-metal elements that is selected from the group consisting of iron and manganese can make an amount of 50% by mol or more. That is, when a summed amount of transition-metal elements is taken as 100% by mol, it is possible to set an amount of at least one member of the other transition-metal elements, which is selected from the group consisting of Mg, Ca, Co, Al, Ni, Nb, Ti, Cr, Cu, Zn, Zr, V, Mo and W, in an amount of from 0 to 50% by mol.

As to a mixing proportion of the lithium-carbonate compound being expressed by $Li_2SiO_3$ and that of the substance including transition-metal element, it is usually preferable to set them to such amounts in which a summed amount of transition-metal element makes from 0.9 to 1.2 moles, and it is more preferable to set them to such amounts in which the summed amount makes from 0.95 to 1.1 moles, with respect to 1-mole lithium-silicate compound.

Production Process for Lithium-Silicate Compound

In a production process for lithium-silicate compound according to the present invention, it is necessary to react a lithium-silicate compound being expressed by $Li_2SiO_3$ with a substance including at least one member of transition-metal elements that is selected from the group consisting of iron and manganese at 400-650° C. in a molten salt of a carbonate mixture comprising lithium carbonate and at least one member of alkali-metal carbonates that is selected from the group consisting of potassium carbonate, sodium carbonate, rubidium carbonate and cesium carbonate in a mixed-gas atmosphere including carbon dioxide and a reducing gas.

Although it is not restrictive particularly as to a specific reaction method, it is usually advisable to mix the aforementioned carbonate mixture, the lithium-silicate compound and the substance including transition-metal element, and then to melt the carbonate mixture by doing heating after mixing them uniformly with use of ball mill, and the like. By means of this, the reaction between the lithium-silicate compound and the transition-metal element progresses in a molten carbonate, and thereby it is possible to obtain a targeted lithium-silicate-system compound.

On this occasion, it is not restrictive particularly as to the mixing proportion between the carbonate mixture and the raw material that includes the lithium-silicate compound and the substance including transition-metal element, and so it can be made up of amounts that enable the raw material to disperse uniformly in a molten salt of the carbonate mixture. For example, it is preferable that a summed amount of the lithium-silicate compound and substance including transition-metal element can make an amount that falls in a range of from 100 to 300 parts by weight, and it is more preferable that the summed amount can make an amount that falls in a range of from 175 to 250 parts by weight, with respect to a summed amount of the carbonate mixture taken as 100 parts by weight.

It is preferable to set a temperature of the reaction between the lithium-silicate compound and the substance including transition-metal element in a molten salt of the carbonate mixture to be from 400 to 650° C., and it is more preferable to set the temperature to be from 450 to 600 V. Therefore, it is necessary to prepare a composition of the carbonate mixture so that the resultant molten temperature of the carbonate mixture falls down below a targeted reaction temperature.

The aforementioned reaction is carried out in a mixed-gas atmosphere including carbon dioxide and a reducing gas in order that a transition-metal element can exist stably as divalent ions at the time of reaction. In this atmosphere, it becomes feasible to stably maintain the transition-metal element in the divalent state. As to a ratio between carbon dioxide and a reducing gas, it is advisable to set the reducing gas so as to make from 0.01 to 0.2 mol, for instance, and it is preferable to set it so as to make from 0.03 to 0.1 mol, with respect to 1-mol carbon dioxide. As for the reducing gas, it is possible to use hydrogen, carbon monoxide, and the like, and hydrogen is preferable especially.

As to a pressure of the mixed gas of carbon dioxide and a reducing gas, there are not any limitations especially. Although it is advisable to usually set it at an atmospheric pressure, it is even good to put the mixed gas either in a pressurized condition or in a depressurized condition.

It is allowable to usually set a time for the reaction between the lithium-silicate compound and the substance including transition-metal element to be from 0.1 to 30 hours, and it is permissible to preferably set it to be from 5 to 25 hours.

By means of removing the alkali-metal carbonate being used as a flux after carrying out the aforementioned reaction, it is possible to obtain a targeted lithium-silicate-system compound.

As for a method of removing the alkali-metal carbonate, it is advisable to dissolve and then remove the alkali-metal carbonate by means of washing products with use of a solvent being capable of dissolving the alkali-metal carbonate. For example, although it is feasible to use water as the solvent, it is preferable to use a nonaqueous solvent, such as alcohol or acetone, and the like, in order to prevent the oxidation of transition metal to be included in the resulting lithium-silicate-system compound. In particular, it is preferable to use acetic anhydride and acetic acid in such a proportion as from 2:1 to 1:1 by weight ratio. In addition to being good in the action of dissolving and then removing the alkali-metal carbonate, this mixed solvent can inhibit water from separating, due to the action that acetic anhydride takes in water to produce acetic acid in a case where the acetic acid reacts with the alkali-metal carbonate to produce water. Note that, in the case of using acetic anhydride and acetic acid, it is preferable to first mix acetic anhydride with products, and then to grind them using mortar, and so forth, in order to make the particles finer, and thereafter to add acetic acid to them in such a state that the acetic anhydride gets accustomed to the particles. In accordance with this method, it is possible to effectively inhibit the oxidation and decomposition of targeted object, because water, which is generated by the reaction between the acetic acid and the alkali-metal carbonate, reacts quickly with the acetic anhydride so that it is possible for products and water to reduce the opportunity of making contact with each other.

Lithium-Silicate-System Compound

A lithium-silicate-system compound that is obtainable by means of the aforementioned process is a compound that is expressed by a compositional formula:

$$Li_{2+a-b}A_bM_{1-x}M'_xSiO_{4+c}$$

(In the formula, "A" is at least one element that is selected from the group consisting of Na, K, Rb and Cs; "M" is at least one element that is selected from the group consisting of Fe and Mn; "M'" is at least one element that is selected from the group consisting of Mg, Ca, Co, Al, Ni, Nb, Ti, Cr, Cu, Zn, Zr, V, Mo and W; and the respective subscripts are specified as follows: $0 \leq x \leq 0.5$; $0 < a < 1$; $0 \leq b < 0.2$; and $0 < c < 0.3$).

The compound becomes a compound that includes Li ions excessively, compared with the stoichiometric amount, because lithium carbonate is included in the molten salt so that lithium ions in the molten salt force into the Li-ion sites of lithium-silicate compound interstitially. Moreover, by means of carrying out the reaction at such a relatively low temperature as from 400 to 650° C. in a molten salt of the carbonate-salt mixture, the growth of crystal grains is inhibited, such fine particles whose average particle diameters are from 50 nm to 10 μm are made, and furthermore the amount of impurity phases is decreased greatly. As a result, in the case of being used as a positive-electrode active material for lithium-ion secondary battery, materials having favorable cyclic characteristics and high capacities are made. It is particularly preferable that a lithium-silicate-system compound that is obtainable by the aforementioned process can be those whose average particle diameters fall in a range of from 50 nm to 10 μm. Note that, in the present description, the "average particle diameters" are values that were found by means of a laser-diffraction particle-size-distribution measuring apparatus (e.g., "SALD-7100" produced by SHIMADZU).

Carbon Coating Treatment

In the lithium-silicate-type compound that is obtainable by the aforementioned process, and which is exhibited by the compositional formula: $Li_{2+a-b}A_bM_{1-x}M'_xSiO_{4+c}$, it is preferable to further carry out coating treatment by means of carbon in order to upgrade the conductivity.

As to a specific method of the coating treatment, it is not restrictive particularly, though a thermal decomposition method is applicable to it, thermal decomposition method in which an organic substance making a carbonaceous source is carbonized by means of heat treatment after mixing the organic substance with the lithium-silicate-system compound uniformly. However, it is particularly preferable to apply a ball-milling method to it, ball-milling method in which a heat treatment is carried out after adding a carbonaceous material and $Li_2CO_3$ to the aforementioned lithium-silicate compound and then mixing them uniformly until the resulting lithium-silicate-type compound turns into being amorphous. In accordance with this method, the lithium-silicate-type compound serving as a positive-electrode active material is turned into being amorphous by means of ball milling, and is thereby mixed uniformly with carbon so that the adhesiveness increases. Furthermore, it is possible to do coating, because carbon precipitates uniformly around the lithium-silicate-type compound by means of the heat treatment, simultaneously with the recrystallization of the aforesaid lithium-silicate-type compound. On this occasion, due to the fact that $Li_2CO_3$ exists, the lithium-rich silicate-system compound does not at all turn into being deficient in lithium, but becomes one which shows a high charging-discharging capacity.

As to an extent of turning into being amorphous, it is advisable that a ratio, $B(011)_{crystal}/B(011)_{mill}$, can fall in a range of from 0.1 to 0.5 approximately in a case where a half-value width of the diffraction peak being derived from the (011) plane regarding a sample having crystallinity before being subjected to ball milling is labeled B(011)$_{crystal}$ and another half-value width of the diffraction peak being derived from the (011) plane of the sample being obtained by means of ball milling is labeled B(011)$_{mill}$ in an X-ray diffraction measurement in which the K$_\alpha$ ray of Cu is the light source.

In this method, it is possible to use acetylene black (or AB), KETJENBLACK (or KB), graphite, and the like, as for the carbonaceous material.

As to a mixing proportion of the lithium-silicate-system compound, that of the carbonaceous material, and that of Li$_2$CO$_3$, it is advisable to mix the carbonaceous material in an amount of from 20 to 40 parts by weight, and Li$_2$CO$_3$ in an amount of from 20 to 40 parts by weight, with respect to the lithium-silicate-system compound in an amount of 100 parts by weight.

The heat treatment is carried out after carrying out a ball-milling treatment until the lithium-silicate compound turns into being amorphous. The heat treatment is carried out in a reducing atmosphere in order to retain transition-metal ions being included in the lithium-silicate compound at divalence. As for the reducing atmosphere in this case, it is preferable to be within a mixed-gas atmosphere of carbon dioxide and a reducing gas in order to inhibit the divalent transition-metal ions from being reduced to the metallic states, in the same manner as the synthesis reaction of the lithium-silicate-system compound within the molten salt of the carbonate mixture. It is advisable to set a mixing proportion of carbon dioxide and that of a reducing gas similarly to those at the time of the synthesis reaction of the lithium-silicate compound.

It is preferable to set a temperature of the heat treatment to be from 500 to 800° C. In a case where the heat-treatment temperature is too low, it is difficult to uniformly precipitate carbon around the lithium-silicate compound. On the other hand, the heat-treatment temperature being too high is not preferable, because the decomposition or lithium deficiency might occur in the resulting lithium-silicate-system compound and thereby the resultant charging-discharging capacity declines.

It is usually advisable to set a time for the heat treatment to be from 1 to 10 hours.

Moreover, as another method of the carbon coating treatment, it is even good to carry out the heat treatment after adding a carbonaceous material and LiF to the aforementioned lithium-silicate-system compound and then mixing them uniformly until the lithium-silicate-system compound turns into being amorphous in the same manner as the aforementioned method. In this instance, carbon precipitates uniformly around the lithium-silicate-system compound to coat it and improve it in the conductivity, simultaneously with the recrystallization of the lithium-silicate-system compound. Furthermore, fluorine atoms substitute for a part of oxygen atoms in the lithium-silicate-system compound. Thus, a fluorine-containing lithium-silicate-system compound can be formed, the fluorine-containing lithium-silicate-system compound being expressed by a compositional formula:

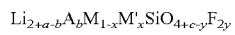

$$Li_{2+a-b}A_bM_{1-x}M'_xSiO_{4+c-y}F_{2y}$$

(In the formula, "A" is at least one element that is selected from the group consisting of Na, K, Rb and Cs; "M" is Fe or Mn; "M'" is at least one element that is selected from the group consisting of Mg, Ca, Co, Al, Ni, Nb, Ti, Cr, Cu, Zn, Zr, V, Mo and W; and the respective subscripts are specified as follows: $0 \leq x \leq 0.5$; $0 < a < 1$; $0 \leq b < 0.2$; $0 < c < 0.3$; and $0 < y < 1$).

This compound makes a positive-electrode active material that has much better performance, because the resulting average voltage is raised from 2.6 V to 2.8 V by means of added F in a case where it is used as a positive-electrode active material. On this occasion, the resultant lithium-rich silicate-system compound makes one which shows a high charging-discharging capacity, because it does not at all turn into being poor in lithium, due to the presence of LiF.

As to mixing proportions of the lithium-silicate-system compound, the carbonaceous material, and LiF in this method, it is allowable to mix the carbonaceous material in an amount of from 20 to 40 parts by weight, and LiF in an amount of from 10 to 40 parts by weight, with respect to the lithium-silicate-system compound in an amount of 100 parts by weight. Furthermore, it is even good that Li$_2$CO$_3$ can be included, if needed. As to conditions of ball milling and heat treatment, it is permissible to set them similarly to those in the aforementioned case.

Positive Electrode for Lithium-Ion Secondary Battery

It is possible to effectively employ any one of the aforementioned lithium-silicate-system compound that is obtainable by means of doing the synthesis in a molten melt, the lithium-silicate-system compound to which the carbon-coating treatment is carried out, and the lithium-silicate-system compound to which fluorine is added, as an active material for the positive electrode of lithium-ion secondary battery. It is possible for a positive electrode using one of these lithium-silicate-system compounds to have the same structure as that of an ordinary positive electrode for lithium-ion secondary battery.

For example, it is possible to fabricate a positive electrode by means of adding an electrically-conductive assistant agent, such as acetylene black (or AB), KETJENBLACK (or KB) or gas-phase method carbon fiber (e.g., vapor growth carbon fiber (or VGCF)), a binder, such as polyvinylidene fluoride (e.g., polyvinylidene difluoride (or PVdF)), polytetrafluoroethylene (or PTFE) or stylenee-butylene rubber (or SBR), and a solvent, such as N-methyl-2-pyrolidione (or NMP), to one of the aforementioned lithium-silicate-system compounds, turning these into being pasty, and then coating the resulting pasty product onto an electricity collector. As to a using amount of the electrically-conductive assistant agent, although it is not restrictive particularly, it is possible to set it in an amount of from 5 to 20 parts by weight with respect to the lithium-silicate-system compound in an amount of 100 parts by weigh, for instance. Moreover, as to a using amount of the binder, although it is not restrictive particularly, either, it is possible to set it in an amount of from 5 to 20 parts by weight with respect to the lithium-silicate-system compound in an amount of 100 parts by weigh, for instance. Moreover, as another method, a positive electrode can also be manufactured by means of such a method in which one being made by mixing the lithium-silicate-system compound with the aforementioned electrically-conductive assistant agent and binder is kneaded as a film shape with use of mortar or pressing machine and then the resultant film-shaped product is press bonded onto an electricity collector by pressing machine.

As for the electricity collector, there are not any limitations, and so it is possible to use materials that have been heretofore employed as positive electrodes for lithium-ion secondary battery conventionally, such as aluminum foils, aluminum meshes and stainless steel meshes, for instance. Furthermore, it is possible to employ carbon nonwoven fabrics, carbon woven fabrics, and the like, too, as the electricity collector.

In the positive electrode for lithium-ion secondary battery according to the present invention, it is not restrictive particularly as to its configuration, thickness, and the like. However, it is preferable to set the thickness to be from 10 to 200 µm, more preferably, to be from 20 to 100 µm, for instance, by means of doing compression after filling up the active material. Therefore, it is advisable to suitably determine a fill-up amount of the active material so as to make the aforementioned thickness after being compressed, in compliance with the types, structures, and so forth, of electricity collectors to be employed.

Lithium-Silicate-System Compound Under Charged Condition or Discharged Condition In the lithium-silicate-system compound that is obtainable by reacting the raw-material compounds in a molten salt of the carbonate mixture in accordance with the aforementioned process, the lithium-silicate-system compound to which the carbon-coating treatment is carried out, and the lithium-silicate-system compound to which fluorine is added, their crystal structures change by means of fabricating lithium-ion secondary batteries with use of these as the positive-electrode active materials for the lithium-ion secondary batteries and then carrying out charging and discharging. Although the lithium-silicate-system compound being obtained by doing the synthesis in a molten salt is unstable in the structure and is also less in the charging capacity, a stable charging-discharging capacity comes to be obtainable because the structure changes to be stabilized by means of charging-discharging. Although it turns into different structures under a charged condition and under a discharged condition, respectively, after the crystal structure of the lithium-silicate-system compound is once changed by carrying out charging-discharging, it is possible to maintain high stability.

It is believed that this stabilization of the structure results from the following: on the occasion of synthesizing the lithium-silicate-system compound by means of the molten-salt method, alkali-metal ions (e.g., Na or K) that do not contribute to charging-discharging are introduced into lithium-silicate compounds because they substitute for a part of the Li sites; and thereby the crystal structure is stabilized; and hence the crystal structure is maintained even when Li undergoes charging-discharging. Furthermore, since the ionic radius of Na (i.e., about 0.99 Å) and the ionic radius of K (i.e., about 1.37 Å) are larger than the ionic radius of Li (i.e., about 0.590 Å), the movement of Li becomes likely to occur, and so the insertion/elimination amount of Li increases, and hence it is believed to consequently lead to the improvement of charging-discharging capacity. Although a charging method and a discharging method for this instance are not limited particularly, it is good to cause constant-electric-current charging/discharging with an electric-current value of 0.1 C for the resulting battery capacity. Although it is advisable to determine a voltage at the time of charging and discharging in compliance with the constituent elements of lithium-ion secondary battery, it is usually possible to set it in a range of from 4.5 V to 1.0 V approximately, and it is preferable to set it in a range of from 4.2 V to 1.5 V approximately.

Hereinafter, crystal structures of each of the lithium-silicate-system compounds under a charged condition and under a discharged condition will be explained while giving specific examples.

(i) Iron-Containing Lithium-Silicate-System Compound

First of all, an iron-containing lithium-silicate-system compound will be explained, iron-containing lithium-silicate-system compound which is obtained by doing synthesis in a molten salt, and which is expressed by a compositional formula, $Li_{2+a-b}A_bFeSiO_{4+c}$ (in the formula, "A" is at least one element that is selected from the group consisting of Na, K, Rb and Cs; and the respective subscripts are specified as follows: $0<"a"<1$; $0\leq"b"<0.2$; and $0<"c"<0.3$).

By means of carrying out constant-current charging up to 4.2 V for a lithium-ion secondary battery that uses the aforesaid iron-containing lithium-silicate-system compound as the positive-electrode active material, and which uses lithium metal as the negative-electrode active material, an obtainable lithium-silicate-system compound under the charged condition turns into one which is expressed by a compositional formula, $Li_{1+a-b}A_bFeSiO_{4+c}$ (in the formula, "A," "a," "b," and "c" are the same as those aforementioned). When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or $2\theta$) are from 5 degrees to 40 degrees. Note that the diffraction angles and half-value widths fall within a range of ±0.03 degrees approximately about the following values.

First Peak: 100% relative intensity, 10.10-degree diffraction angle, and 0.11-degree half-value width;

Second Peak: 81% relative intensity, 16.06-degree diffraction angle, and 0.10-degree half-value width;

Third Peak: 76% relative intensity, 9.88-degree diffraction angle, and 0.14-degree half-value width;

Fourth Peak: 58% relative intensity, 14.54-degree diffraction angle, and 0.16-degree half-value width; and Fifth Peak: 47% relative intensity, 15.50-degree diffraction angle, and 0.12-degree half-value width Since the aforementioned diffraction peaks are different from the diffraction peaks of the iron-containing lithium-silicate-type compound that has been synthesized in a molten salt, it is possible to ascertain that the crystal structure changes by means of charging. Note that it is possible to measure the aforementioned diffraction peaks by the subsequent method, for instance.

First of all, a charged electrode is washed with a linear carbonate-ester-system solvent several times, thereby removing impurities being adhered on the surfaces of the electrode. Thereafter, an electrode layer (not including the electricity collector) is peeled off from the obtained electrode after doing vacuum drying, is then filled up into a glass capillary, and is encapsulated in it using an epoxy adhesive agent. Thereafter, it is possible to identify the lithium-silicate-system compound under a charged condition by means of measuring the X-ray diffraction patterns with use of an X-ray whose wavelength is 0.7 Å. On this occasion, as for the linear carbonate-ester-system compound, it is possible to use dimethyl carbonate (or DMC), diethyl carbonate (or DEC), ethyl methyl carbonate (or EMC), and the like.

Moreover, when the iron-containing lithium-silicate-system compound, which has been subjected to the charging up to 4.2 V by the aforementioned method, is then subjected to constant-current discharging down to 1.5 V, an obtainable lithium-silicate-system compound under the discharged condition turns into one which is expressed by a compositional formula, $Li_{2+a-b}A_bFeSiO_{4+c}$ (in the formula, "A," "a," "b," and "c" are the same as those aforementioned). When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or $2\theta$) are from 5 degrees to 40 degrees. Note that the diffraction angles and half-value widths fall within a range of ±0.03 degrees approximately about the following values.

First Peak: 100% relative intensity, 16.07-degree diffraction angle, and 0.08-degree half-value width;
Second Peak: 71% relative intensity, 14.92-degree diffraction angle, and 0.17-degree half-value width;
Third Peak: 44% relative intensity, 10.30-degree diffraction angle, and 0.08-degree half-value width;
Fourth Peak: 29% relative intensity, 9.82-degree diffraction angle, and 0.11-degree half-value width; and
Fifth Peak: 26% relative intensity, 21.98-degree diffraction angle, and 0.14-degree half-value width Since the aforementioned diffraction peaks are all different from the diffraction peaks of the iron-containing lithium-silicate-type compound that has been synthesized in a molten salt, and from the diffraction peaks of the iron-containing lithium-silicate-type compound after the charging, it is possible to ascertain that the crystal structure changes by means of discharging as well.

(ii) Manganese-Containing Lithium-Silicate-System Compound

Next, a manganese-containing lithium-silicate-system compound will be explained, manganese-containing lithium-silicate-system compound which is obtained by doing synthesis in a molten salt, and which is expressed by a compositional formula, $Li_{2+a-b}A_bMnSiO_{4+c}$ (in the formula, "A" is at least one element that is selected from the group consisting of Na, K, Rb and Cs; and the respective subscripts are specified as follows: $0<"a"<1$; $0\leq"b"<0.2$; and $0<"c"<0.3$).

By means of carrying out constant-current charging up to 4.2 V for a lithium-ion secondary battery that uses the aforesaid lithium-silicate-system compound as the positive-electrode active material, and which uses lithium metal as the negative-electrode active material, an obtainable lithium-silicate-system compound under the charged condition turns into one which is expressed by a compositional formula, $Li_{1+a-b}A_bMnSiO_{4+c}$ (in the formula, "A," "a," "b," and "c" are the same as those aforementioned). When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or 2θ) are from 5 degrees to 40 degrees. Note that the diffraction angles and half-value widths fall within a range of ±0.03 degrees approximately about the following values.

First Peak: 100% relative intensity, 8.15-degree diffraction angle, and 0.18-degree half-value width;
Second Peak: 64% relative intensity, 11.60-degree diffraction angle, and 0.46-degree half-value width;
Third Peak: 41% relative intensity, 17.17-degree diffraction angle, and 0.18-degree half-value width;
Fourth Peak: 37% relative intensity, 11.04-degree diffraction angle, and 0.31-degree half-value width; and
Fifth Peak: 34% relative intensity, 19.87-degree diffraction angle, and 0.29-degree half-value width Since the aforementioned diffraction peaks are different from the diffraction peaks of the manganese-containing lithium-silicate-type compound that has been synthesized in a molten salt, it is possible to ascertain that the crystal structure changes by means of charging.

Moreover, when the manganese-containing lithium-silicate-system compound, which has been subjected to the charging up to 4.2 V by the aforementioned method, is then subjected to constant-current discharging down to 1.5 V, an obtainable lithium-silicate-system compound under the discharged condition turns into one which is expressed by a compositional formula, $Li_{2+a-b}A_bMnSiO_{4+c}$ (in the formula, "A," "a," "b," and "c" are the same as those aforementioned). When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or 2θ) are from 5 degrees to 40 degrees. Note that the diffraction angles and half-value widths fall within a range of ±0.03 degrees approximately about the following values.

First Peak: 100% relative intensity, 8.16-degree diffraction angle, and 0.22-degree half-value width;
Second Peak: 71% relative intensity, 11.53-degree diffraction angle, and 0.40-degree half-value width;
Third Peak: 67% relative intensity, 11.66-degree diffraction angle, and 0.53-degree half-value width;
Fourth Peak: 61% relative intensity, 11.03-degree diffraction angle, and 0.065-degree half-value width; and
Fifth Peak: 52% relative intensity, 11.35-degree diffraction angle, and 0.70-degree half-value width Since the aforementioned diffraction peaks are all different from the diffraction peaks of the manganese-containing lithium-silicate-type compound that has been synthesized in a molten salt, and from the diffraction peaks of the manganese-containing lithium-silicate-type compound after the charging, it is possible to ascertain that the crystal structure changes by means of discharging as well.

Note that, in each of the aforementioned iron-containing lithium-silicate-system compound and manganese-containing lithium-silicate-system compound, it is preferable that a substitution amount of element "A," namely, the value of "b," can be from 0.0001 to 0.05 approximately, and it is more preferable that it can be from 0.0005 to 0.02 approximately.

Lithium-Ion Secondary Battery

It is possible to manufacture a lithium-ion secondary battery that uses the aforementioned positive electrode for lithium-ion secondary battery by means of publicly-known methods. That is, it is advisable to follow an ordinary process in order to assemble a lithium-ion secondary battery while employing the aforementioned positive electrode as a positive-electrode material; employing publicly-known metallic lithium, a carbon-system material such as graphite, a silicon-system material such as silicon thin film, an alloy-system material such as copper-tin or cobalt-tin, or an oxide material such as lithium titanate, as a negative-electrode material; a solution, in which a lithium salt, such as lithium perchlorate, $LiPF_6$, $LiBF_4$ or $LiCF_3SO_3$, is dissolved in a concentration of from 0.5 mol/L to 1.7 mol/L in a publicly-known nonaqueous-system solvent, such as ethylene carbonate, dimethyl carbonate, propylene carbonate or dimethyl carbonate, as an electrolytic solution; and further employing the other publicly-known constituent elements for battery.

Effect of the Invention

The lithium-silicate-system compounds that are obtainable by means of the processes according to the present invention are inexpensive, are those which are obtainable using raw materials that are abundant in the resource amounts and are low in the environmental loads, and are materials that can keep down the elimination of oxygen in a case where they are used as a positive-electrode active material for lithium-ion secondary battery.

In particular, in accordance with the present invention, it is possible to obtain lithium-silicate compounds, which are useful as positive-electrode active materials for lithium-ion secondary battery that has a high capacity and is good in terms of cyclic characteristics as well, by means of such a relatively simple and easy means as the reaction in a molten salt.

Moreover, the aforementioned lithium-silicate-system compounds make positive-electrode active materials that have stable charging-discharging capacities, because the crystal structures of the lithium-silicate-system compounds are changed and are then stabilized by means of carrying out charging and discharging with use of the lithium-silicate-system compounds as positive-electrode active materials for lithium-ion secondary battery.

MODES FOR CARRYING OUT THE INVENTION

Hereinafter, the present invention will be explained in more detail while giving examples.

Example No. 1

Lithium-Rich Silicate-System Compound, and Charging-Discharging Characteristics of Battery Using the Same <Iron-Containing Lithium-Silicate Compound>

0.03 mol of iron oxalate, $FeC_2O_4 \cdot 2H_2O$ (produced by SIGMA-ALDRICH, and with 99.99% purity), and 0.03 mol of lithium silicate, $Li_2SiO_3$ (produced by KISHIDA KAGAKU, and with 99.5% purity), were used as raw materials; and these were mixed with a carbonate mixture (e.g., one which was made by mixing lithium carbonate (produced by KISHIDA KAGAKU, and with 99.9% purity), sodium carbonate (produced by KISHIDA KAGAKU, and with 99.5% purity) and potassium carbonate (produced by KISHIDA KAGAKU, and with 99.5% purity) in a ratio of 0.435:0.315:0.25 by mol). The mixing proportion was set at such a proportion that a summed amount of the iron oxalate and lithium silicate was 225 parts by weight with respect to 100 parts by weight of the carbonate mixture. After adding 20 mL of acetone to these, they were mixed by a ball mill made of zirconia at a rate of 500 rpm for 60 minutes, and were then dried. Thereafter, the thus obtained powder was heated in a golden crucible, and was then heated to 550° C. in a mixed-gas atmosphere of carbon dioxide (e.g., 100-mL/min flow volume) and hydrogen (e.g., 3-mL/min flow volume) in order to react them for 21 hours in a state where the carbonate mixture was fused.

After the reaction, the temperature was lowered. At the time of reaching 500° C., the entirety of a reactor core, the reaction system, was taken from out of an electric furnace, the heater, and was then cooled rapidly while keeping letting the gases pass through.

Subsequently, the resulting product was grounded with a mortar after adding acetic anhydride (e.g., 20 mL) to it. Then, the carbonates, and the like, were reacted to remove them after adding acetic acid (e.g., 10 mL) to it. Thus, a powder of iron-containing lithium-silicate compound was obtained by doing filtration.

Figure 1:
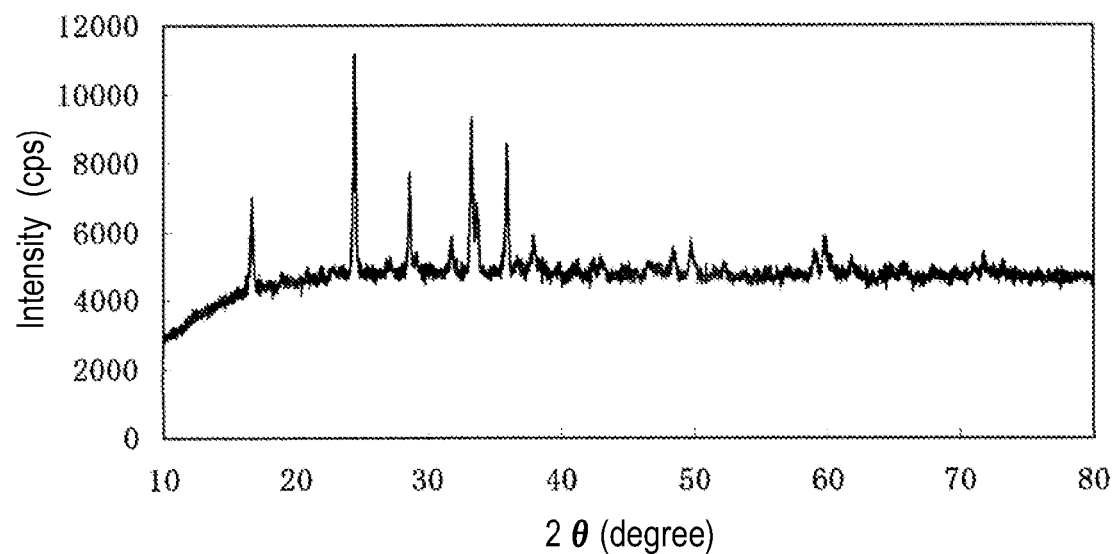
FIG. 1 is a diagram that illustrates an X-ray diffraction pattern of a product according to Example No. 1.

An X-ray diffraction measurement was carried out for the obtained product by means of a powder X-ray diffraction apparatus with use of the $CuK_\alpha$ ray. The resulting XRD pattern is shown in FIG. 1. This XRD pattern agreed with the reported pattern of single-crystal $Li_2FeSiO_4$ in the space group "$P2_1$" virtually.

Figure 2:
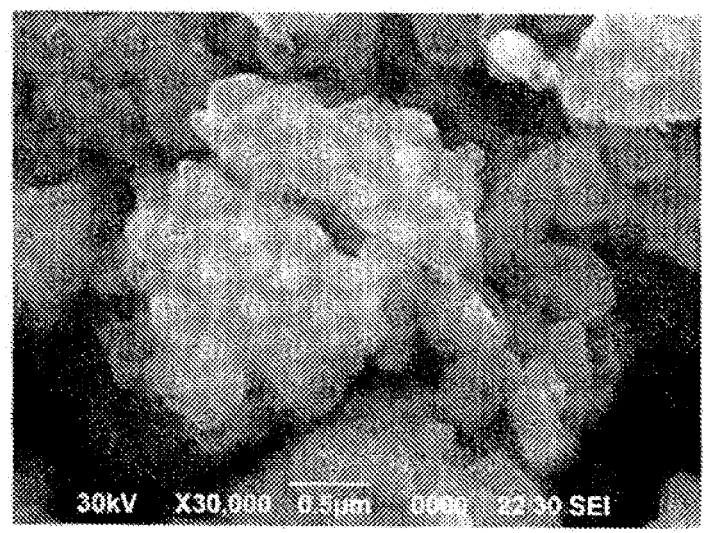
FIG. 2 is a scanning electron microscope (or SEM) photograph of the product according to Example No. 1.

Moreover, a scanning electron microscope (or SEM) photograph of the aforesaid product is shown in FIG. 2. It was possible to ascertain from FIG. 2 that the product was a powder that comprised crystal particles with about 200 nm or less.

In addition, as a result of doing elemental analysis for the aforesaid product by means of an inductively-coupled plasma (or ICP) method, it was possible to ascertain that it had a compositional formula, $Li_{1.970}Na_{0.017}K_{0.024}Fe_{1.066}SiO_{4.156}$, and that it was a lithium-rich $Li_2FeSiO_4$-type lithium-silicate-system compound.

Subsequently, 50 parts by weight of acetylene black (being represented as "AB" hereinafter) and 10 parts by weight of $Li_2CO_3$ were added to 100 parts by weight of the powder being obtained by the aforementioned process. Then, they were subjected to a milling process at a rate of 450 rpm for 5 hours with use of a planetary ball mill (with 5-mm zirconia balls), and were then subjected to a heat treatment at 700° C. for 2 hours in a mixed-gas atmosphere of carbon dioxide and hydrogen (e.g., $CO_2:H_2=100:3$ by molar ratio).

Figure 3:
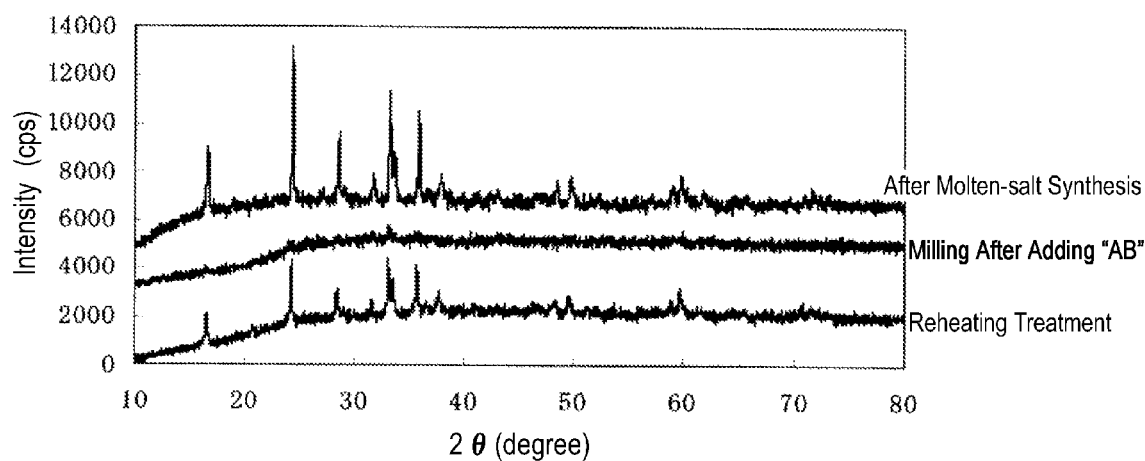
FIG. 3 illustrates an X-ray diffraction pattern of another product that was after adding acetylene black and $Li_2CO_3$ to and mixing them with the product according to Example No. 1 and then subjecting the product to a heat treatment.

An XRD pattern of the product after the heat treatment is shown in FIG. 3. Since the XRD pattern being shown in FIG. 3 agrees well with the XRD pattern of the sample prior to the heat treatment, it was possible to ascertain that the lithium-rich silicate-system compound being subjected to the heat treatment maintained the crystal structure without ever being decomposed by means of the aforementioned heat treatment.

25 parts by weight of a mixture of acetylene black and PTFE (e.g. a mixture with a ratio, AB:PTFE=2:1 by weight) was added with respect to 100 parts by weight of the powder being obtained. Then, an electrode was prepared by means of a sheet method, and was vacuum dried at 140° C. for 3 hours. Thereafter, a trial coin battery was made with use of the following: a solution serving as the electrolytic solution, solution in which $LiPF_6$ was dissolved in a concentration of 1 mol/L in a mixture having a ratio, ethylene carbonate (or EC):diethylene carbonate (or DEC)=1:1; a polypropylene film (e.g., "CELGARD2400" produced by CELGARD) serving as the separator; and a lithium-metal foil serving as the negative electrode.

As a result of carrying out a charging-discharging test for this coin battery at 60° C. with 0.01 mA in a voltage range of from 4.2 to 1.5 V, the charging capacity after 5 cycles was 250 $mAhg^{-1}$. Moreover, upon measuring the cyclic characteristics under the same conditions, favorable cyclic characteristics were demonstrated because the average voltage was 2.60 V after 50 cycles. These results are shown in Table 1 below.

Moreover, the battery characteristics, which were measured in the same manner for a material that was synthesized by a process (e.g., a solid-phase reaction method) in which lithium carbonate, $Li_2CO_3$, iron oxalate, $FeC_2O_4 \cdot 2H_2O$, and silicon oxide, $SiO_2$, were heat treated at 800° C. for 6 hours after subjecting them to ball milling, are shown in Table 1 below.

TABLE 1

|  | Discharging Capacity after 5 Cycles (mAh/g) | Average Voltage (V) | Number of Cycles |
|---|---|---|---|
| Solid-phase Reaction Method | 160 | 2.53 | 20 |
| Example No. 1 (Molten-salt Method) | 250 | 2.60 | 50 |

As can be evident from the results above, it was appreciated that iron-containing lithium-silicate-system materials, which are favorable in the cyclic characteristics and have higher capacities, are obtainable in accordance with the process in which raw-material compounds are reacted in the molten salt of carbonate mixture.

<Structures Under Charged Condition and Under Discharged Condition>

Figure 4:
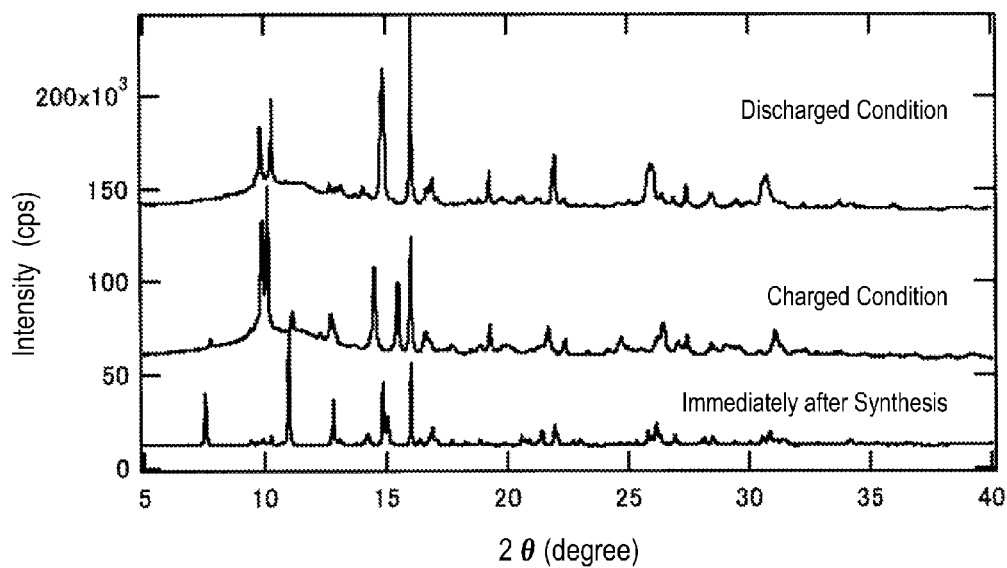
FIG. 4 illustrates X-ray diffraction patterns that were obtained by means of measuring radiated lights for an iron-containing lithium-silicate-system compound that was obtained in Example No. 1, for the aforesaid compound under a charged condition, and for the aforesaid compound under a discharged condition.

After subjecting the aforementioned coin battery to charging at 60° C. with 0.01 mA up to a voltage of 4.2 V, the charged electrode was washed with use of a linear carbonate-ester-system solvent, and then impurities being adhered on the electrode's surfaces were removed. Thereafter, the obtained electrode was vacuum dried, and the electrode layer was encapsulated in a glass capillary with use of an epoxy-resin adhesive agent after being peeled off from the electrode and filling up the glass capillary. Thereafter, an X-ray diffraction measurement was carried out for the iron-containing lithium-silicate-system compound under the charged condition with use of a radiated light (e.g., "BL19B2," a beam line with 0.7-Å wavelength that is available at SPring-8). The obtained X-ray diffraction pattern is shown in FIG. 4. Moreover, for an iron-containing lithium-silicate-system compound as well that was immediately after being synthesized in the molten salt, the X-ray diffraction measurement was carried out in the same manner with use of the radiated light (e.g., "BL19B2," a beam line with 0.7-Å wavelength that is available at SPring-8). The obtained X-ray diffraction pattern is also shown in FIG. 4.

In addition, the peak positions and relative intensities, which were found from the results of X-ray diffraction, are shown in Table 2 and Table 3, respectively, for the ion-containing lithium-silicate-system compound after the synthesis in the molten salt, and for the iron-containing lithium-silicate-system compound after the charging.

TABLE 2

Results of XRD Measurement on Iron-containing Lithium-silicate-system Compound after Molten-salt Synthesis

| 2θ (degree) | Relative Intensity (%) |
|---|---|
| 7.53 | 47 |
| 9.40 | 4 |
| 9.66 | 2 |
| 9.89 | 4 |
| 10.26 | 7 |
| 10.99 | 100 |
| 12.83 | 40 |
| 13.07 | 5 |
| 13.25 | 1 |
| 13.77 | 2 |
| 14.23 | 9 |
| 14.89 | 55 |
| 15.08 | 25 |
| 16.05 | 72 |
| 16.41 | 5 |
| 16.93 | 15 |
| 17.09 | 5 |
| 17.75 | 5 |
| 18.28 | 3 |
| 18.88 | 6 |
| 19.12 | 2 |
| 19.22 | 2 |
| 19.88 | 3 |
| 20.61 | 9 |
| 20.74 | 5 |
| 20.92 | 5 |
| 21.26 | 3 |
| 21.44 | 13 |
| 21.97 | 18 |
| 22.09 | 8 |
| 22.72 | 4 |
| 23.04 | 6 |
| 23.60 | 1 |
| 24.14 | 1 |
| 24.68 | 2 |
| 24.99 | 2 |
| 25.35 | 4 |
| 25.83 | 11 |
| 26.17 | 20 |
| 26.34 | 6 |
| 26.94 | 8 |
| 27.32 | 1 |
| 27.94 | 2 |
| 28.14 | 5 |
| 28.50 | 7 |
| 29.41 | 3 |
| 30.04 | 3 |
| 30.55 | 5 |
| 30.85 | 11 |
| 31.14 | 3 |
| 31.37 | 3 |
| 31.46 | 2 |
| 32.40 | 1 |
| 32.80 | 2 |
| 33.15 | 1 |
| 33.53 | 1 |
| 34.18 | 5 |
| 34.64 | 2 |
| 35.26 | 2 |
| 35.94 | 1 |
| 36.52 | 2 |
| 37.04 | 1 |
| 37.92 | 1 |
| 38.41 | 1 |
| 38.85 | 1 |
| 39.14 | 2 |
| 39.94 | 2 |

TABLE 3

Results of XRD Measurement on Iron-containing Lithium-silicate-system Compound under Condition of being Charged up to 4.2 V

| 2θ (degree) | Relative Intensity (%) |
|---|---|
| 7.74 | 5 |
| 9.88 | 76 |
| 10.10 | 100 |
| 11.14 | 13 |
| 12.28 | 4 |
| 12.74 | 19 |
| 13.77 | 2 |
| 14.54 | 58 |
| 15.50 | 47 |
| 16.06 | 81 |
| 16.63 | 14 |
| 16.84 | 8 |
| 17.16 | 2 |
| 17.47 | 2 |
| 17.78 | 5 |
| 18.56 | 1 |
| 18.90 | 4 |
| 19.30 | 18 |
| 19.84 | 4 |
| 20.06 | 5 |
| 20.24 | 3 |
| 20.98 | 1 |
| 21.26 | 3 |
| 21.41 | 3 |
| 21.72 | 18 |
| 22.39 | 10 |
| 23.02 | 1 |
| 23.35 | 2 |
| 24.20 | 2 |
| 24.70 | 10 |
| 24.97 | 4 |
| 25.16 | 1 |
| 25.51 | 2 |
| 26.22 | 11 |
| 26.47 | 20 |
| 27.07 | 6 |
| 27.43 | 12 |
| 28.46 | 6 |
| 29.02 | 3 |
| 29.34 | 4 |
| 29.60 | 3 |
| 30.44 | 2 |
| 31.10 | 16 |
| 31.33 | 5 |
| 31.94 | 2 |
| 32.29 | 3 |
| 32.80 | 1 |
| 33.16 | 1 |
| 33.57 | 2 |
| 33.74 | 3 |
| 34.69 | 1 |
| 35.77 | 1 |
| 36.69 | 1 |
| 36.88 | 2 |
| 37.54 | 1 |
| 38.21 | 1 |
| 39.20 | 3 |

Moreover, with use of an electrode that was discharged down to a voltage of 1.5 V after being charged up to 4.2 V by the aforementioned method, the X-ray diffraction measurement was carried out in the same manner as the aforementioned method for an iron-containing lithium-silicate-system compound under a condition of being discharged. The obtained X-ray diffraction pattern is shown in FIG. 4, and the peak positions and relative intensities are shown in Table 4 below.

TABLE 4

Results of XRD Measurement on Iron-containing Lithium-silicate-system Compound under Condition of being Discharged down to 1.5 V

| 2θ (degree) | Relative Intensity (%) |
|---|---|
| 9.64 | 4 |
| 9.82 | 29 |
| 10.30 | 44 |
| 10.90 | 1 |
| 12.69 | 5 |
| 12.96 | 2 |
| 13.15 | 5 |
| 13.60 | 1 |
| 13.76 | 1 |
| 14.06 | 6 |
| 14.30 | 2 |
| 14.92 | 71 |
| 16.07 | 100 |
| 16.70 | 8 |
| 16.95 | 13 |
| 17.16 | 2 |
| 17.71 | 1 |
| 18.10 | 1 |
| 18.46 | 2 |
| 18.88 | 2 |
| 19.30 | 18 |
| 19.82 | 3 |
| 20.02 | 1 |
| 20.52 | 3 |
| 20.68 | 4 |
| 21.34 | 3 |
| 21.98 | 26 |
| 22.34 | 3 |
| 22.87 | 1 |
| 23.23 | 1 |
| 23.72 | 1 |
| 24.67 | 1 |
| 25.08 | 3 |
| 25.53 | 1 |
| 25.95 | 21 |
| 26.06 | 20 |
| 26.40 | 3 |
| 26.89 | 4 |
| 27.42 | 12 |
| 27.61 | 2 |
| 28.21 | 2 |
| 28.46 | 7 |
| 29.48 | 3 |
| 29.89 | 1 |
| 30.04 | 2 |
| 30.65 | 13 |
| 30.77 | 15 |
| 31.42 | 2 |
| 32.26 | 2 |
| 32.85 | 1 |
| 33.19 | 1 |
| 33.57 | 1 |
| 33.74 | 4 |
| 34.23 | 1 |
| 36.02 | 2 |
| 37.48 | 1 |
| 38.29 | 1 |
| 38.98 | 1 |
| 39.14 | 1 |
| 40.00 | 1 |

As can be evident from the results above, it was appreciated that iron-containing lithium-silicate system compounds, which are obtained by doing synthesis in molten salt, come to have distinctive crystal structures, which correspond to the charged condition and to the discharged condition, respectively, by means of carrying out charging and discharging.

Example No. 2

Manganese-Containing Lithium-Silicate-System Compound

A powder of manganese-containing lithium-silicate-system compound was obtained under the same conditions as those of Example No. 1, using manganese oxalate instead of the iron oxalate used in Example No. 1.

An X-ray diffraction measurement was carried out for the obtained product by means of a powder X-ray diffraction apparatus with use of the CuK$_\alpha$ ray. The XRD pattern of this product agreed with the XRD pattern of orthorhombic crystal in the space group "Pmn2$_1$" virtually.

Moreover, it was possible to ascertain that the product was a powder that comprised crystal particles with about 200 nm or less by means of a scanning electron microscope (or SEM) observation. In addition, as a result of doing elemental analysis for the aforesaid product by means of an inductively-coupled plasma (or ICP) method, it was possible to ascertain that it came to have a compositional formula, $Li_{1.980}Na_{0.016}K_{0.025}Mn_{1.062}SiO_{4.151}$, and that it was a lithium-rich $Li_2MnSiO_4$-type lithium-silicate-system compound.

Subsequently, a coin battery was manufactured via the same treatments as those in Example No. 1. As a result of carrying out a charging-discharging test for this coin battery at 60° C. with 0.01 mA in a voltage range of from 4.2 to 1.5 V, the charging capacity after 5 cycles was 220 mAhg$^{-1}$. Moreover, upon measuring the cyclic characteristics under the same conditions, favorable cyclic characteristics were demonstrated because the average voltage was 2.75 V after 50 cycles. These results are shown in Table 5 below.

Moreover, the battery characteristics, which were measured in the same manner for a material that was synthesized by a process (e.g., a solid-phase reaction method) in which lithium carbonate, $Li_2CO_3$, manganese oxalate, $MnC_2O_4\cdot 2H_2O$, and silicon oxide, $SiO_2$, were heat treated at 800° C. for 6 hours after subjecting them to ball milling, are also shown in Table 5 below.

TABLE 5

|  | Discharging Capacity after 5 Cycles (mAh/g) | Average Voltage (V) | Number of Cycles |
|---|---|---|---|
| Solid-phase Reaction Method | 100 | 2.70 | 10 |
| Example No. 2 (Molten-salt Method) | 220 | 2.75 | 30 |

As can be evident from the results above, it was appreciated that manganese-containing lithium-silicate-system materials, which are favorable in the cyclic characteristics and have higher capacities, are obtainable in accordance with the process in which raw-material compounds are reacted in the molten salt of carbonate mixture.

<Structures Under Charged Condition and Under Discharged Condition>

Figure 5:
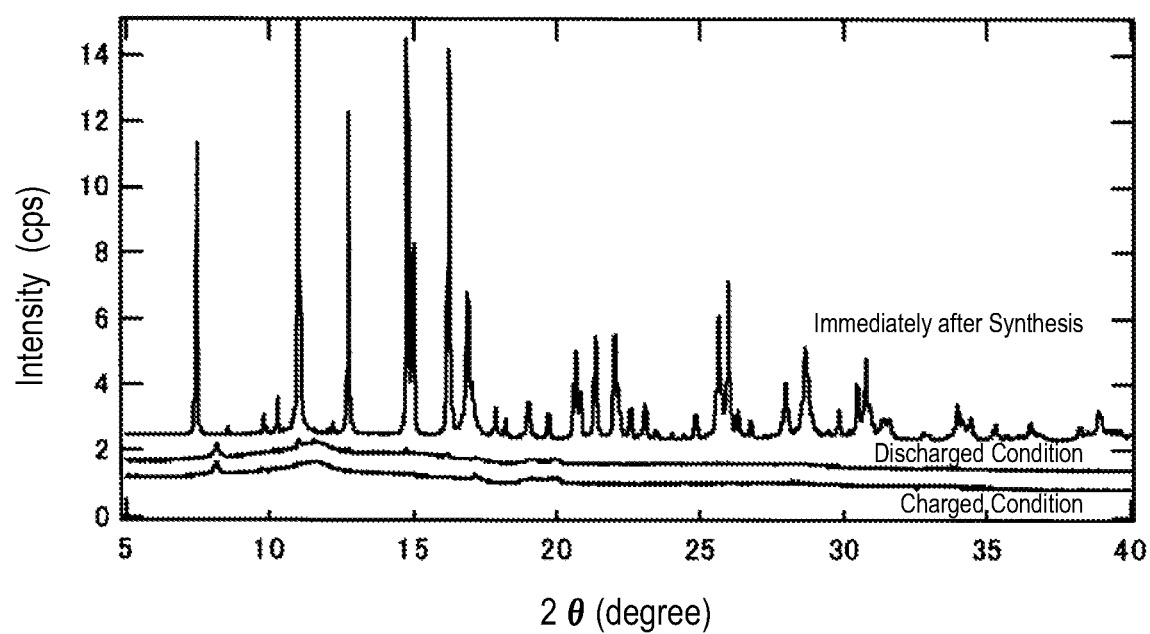
FIG. 5 illustrates X-ray diffraction patterns that were obtained by means of measuring radiated lights for a manganese-containing lithium-silicate-system compound that was obtained in Example No. 2, for the aforesaid compound under a charged condition, and for the aforesaid compound under a discharged condition.

After subjecting the aforementioned coin battery to charging at 60° C. with 0.01 mA up to a voltage of 4.2 V, the same treatments as those in Example No. 1 were carried out to peel off the electrode layer, and then an X-ray diffraction measurement was carried out for the manganese-containing lithium-silicate-system compound under the charged condition with use of a radiated light (e.g., "BL19B2," a beam line with 0.7-Å wavelength that is available at SPring-8). The obtained X-ray diffraction pattern is shown in FIG. 5. Moreover, for a manganese-containing lithium-silicate-system compound as well that was immediately after being synthesized in the molten salt, the X-ray diffraction measurement was carried out in the same manner with use of the radiated light (e.g., "BL19B2," a beam line with 0.7-Å wavelength that is available at SPring-8). The obtained X-ray diffraction pattern is also shown in FIG. 5.

In addition, the peak positions and relative intensities, which were found from the results of X-ray diffraction, are shown in Table 6 and Table 7, respectively, for the manganese-containing lithium-silicate-system compound after the synthesis in the molten salt, and for the manganese-containing lithium-silicate-system compound after the charging.

TABLE 6

Results of XRD Measurement on Manganese-containing Lithium-silicate-system Compound after Molten-salt Synthesis

| 2θ (degree) | Relative Intensity (%) |
|---|---|
| 7.48 | 46 |
| 8.56 | 1 |
| 9.82 | 3 |
| 10.30 | 6 |
| 11.02 | 100 |
| 12.02 | 1 |
| 12.18 | 2 |
| 12.74 | 52 |
| 14.79 | 64 |
| 14.98 | 32 |
| 16.22 | 63 |
| 16.88 | 24 |
| 17.04 | 10 |
| 17.30 | 2 |
| 17.88 | 5 |
| 18.22 | 3 |
| 19.00 | 6 |
| 19.72 | 4 |
| 20.68 | 15 |
| 20.83 | 8 |
| 21.35 | 17 |
| 22.02 | 18 |
| 22.14 | 9 |
| 22.56 | 5 |
| 23.06 | 6 |
| 23.46 | 1 |
| 23.99 | 1 |
| 24.41 | 1 |
| 24.85 | 4 |
| 25.29 | 1 |
| 25.64 | 21 |
| 25.99 | 27 |
| 26.32 | 5 |
| 26.75 | 3 |
| 27.98 | 10 |
| 28.68 | 16 |
| 29.45 | 2 |
| 29.83 | 5 |
| 30.23 | 2 |
| 30.49 | 10 |
| 30.79 | 14 |
| 30.94 | 6 |
| 31.36 | 3 |
| 31.43 | 3 |
| 31.57 | 3 |
| 32.77 | 1 |
| 32.92 | 1 |
| 33.96 | 6 |
| 34.13 | 3 |
| 34.41 | 4 |
| 35.29 | 2 |
| 35.70 | 1 |

TABLE 6-continued

Results of XRD Measurement on Manganese-containing Lithium-silicate-system Compound after Molten-salt Synthesis

| 2θ (degree) | Relative Intensity (%) |
| --- | --- |
| 36.13 | 1 |
| 36.53 | 3 |
| 36.80 | 1 |
| 36.89 | 1 |
| 37.05 | 1 |
| 38.26 | 3 |
| 38.54 | 2 |
| 38.91 | 6 |
| 39.23 | 3 |
| 39.43 | 3 |
| 39.65 | 3 |

TABLE 7

Results of XRD Measurement on Manganese-containing Lithium-silicate-system Compound under Condition of being Charged up to 4.2 V

| 2θ (degree) | Relative Intensity (%) |
| --- | --- |
| 8.15 | 100 |
| 9.76 | 24 |
| 11.04 | 37 |
| 11.60 | 64 |
| 14.80 | 7 |
| 14.96 | 9 |
| 16.25 | 9 |
| 17.17 | 41 |
| 17.25 | 14 |
| 19.11 | 24 |
| 19.53 | 18 |
| 19.9 | 34 |
| 20.0 | 24 |
| 25.6 | 7 |
| 26.0 | 6 |
| 27.9 | 7 |
| 28.2 | 16 |
| 28.4 | 19 |
| 28.6 | 9 |
| 33.2 | 14 |
| 33.5 | 12 |

Moreover, with use of an electrode that was discharged down to a voltage of 1.5 V after being charged up to 4.2 V by the aforementioned method, the X-ray diffraction measurement was carried out in the same manner as the aforementioned method for a manganese-containing lithium-silicate-system compound under a condition of being discharged. The obtained X-ray diffraction pattern is shown in FIG. 5, and the peak positions and relative intensities for the discharged manganese-containing lithium-silicate-system compound are shown in Table 8 below.

TABLE 8

Results of XRD Measurement on Manganese-containing Lithium-silicate-system Compound that was Discharged down to 1.5 V

| 2θ (degree) | Relative Intensity (%) |
| --- | --- |
| 7.44 | 13 |
| 8.16 | 100 |
| 11.03 | 61 |

TABLE 8-continued

Results of XRD Measurement on Manganese-containing Lithium-silicate-system Compound that was Discharged down to 1.5 V

| 2θ (degree) | Relative Intensity (%) |
| --- | --- |
| 11.35 | 52 |
| 11.53 | 71 |
| 11.66 | 67 |
| 12.71 | 30 |
| 13.65 | 12 |
| 13.97 | 11 |
| 14.16 | 12 |
| 14.77 | 36 |
| 14.90 | 19 |
| 16.18 | 25 |
| 16.84 | 8 |
| 17.19 | 26 |
| 17.27 | 14 |
| 19.00 | 11 |
| 19.18 | 14 |
| 19.54 | 16 |
| 19.85 | 26 |
| 19.95 | 19 |
| 21.32 | 13 |
| 21.98 | 11 |
| 24.86 | 7 |
| 25.58 | 13 |
| 25.95 | 14 |
| 26.76 | 7 |
| 27.96 | 10 |
| 28.14 | 10 |
| 28.45 | 16 |
| 28.64 | 12 |
| 29.73 | 6 |
| 30.46 | 6 |
| 30.78 | 7 |
| 33.20 | 10 |
| 33.51 | 12 |
| 37.90 | 6 |
| 38.84 | 6 |

As can be evident from the results above, it was appreciated that manganese-containing lithium-silicate system compounds, which are obtained by doing synthesis in molten salt, come to have distinctive crystal structures, which correspond to the charged condition and to the discharged condition, respectively, by means of carrying out charging and discharging.

Example No. 3

Lithium-rich silicate-system compounds, which were expressed by a compositional formula: $Li_{2+a+b}A_bM_{1-x}M'_xSiO_{4+c}$ (in the formula, "A" is at least one element that is selected from the group consisting of Na, K, Rb and Cs; "M" is at least one element that is selected from the group consisting of Fe and Mn; "M'" is at least one element that is selected from the group consisting of Mg, Ca, Co, Al, Ni, Nb, Ti, Cr, Cu, Zn, Zr, V, Mo and W; and the respective subscripts are specified as follows: $0 \leq x \leq 0.5$; $0 < a < 1$; $0 \leq b < 0.2$; and $0 < c < 0.3$), were synthesized in the same manner as Example No. 1, except that transition-metal components being in compliance with target compositions shown in Tables 9 and 10 below were used instead of the iron oxalate that was used in the process according to Example No. 1.

Note that, as for the raw materials, the following were used: iron oxalate, $FeC_2O_4 \cdot 2H_2O$ (produced by SIGMA-ALDRICH, and with 99.99% purity); lithium silicate, $Li_2SiO_3$ (produced by KISHIDA KAGAKU, and with 99.5% purity); manganese oxalate; cobalt oxalate; magnesium sulfate; nickel oxide; niobium oxide; calcium oxide; aluminum oxide; lithium molybdenum oxide; and lithium tungsten oxide. The number of moles for each of the raw materials was adjusted so as to make the same metallic-component ratio as the metallic-component ratio of target substance in compliance with a targeted compound. Moreover, as to the compounds other than the lithium silicate, they were used so that the total number of moles for the metallic element made 0.03 mole.

Regarding the products that were after water-soluble substances, such as the carbonate salts, had been removed, the results of the elemental analysis (i.e., elemental molar ratios) that were found by means of an ICP method are shown in Table 9 and Table 10 below. As can be evident from these tables, it was possible to ascertain that the products were all found to be lithium-rich lithium-silicate-system compounds.

Subsequently, for each of the lithium-silicate-system compounds being obtained by the aforementioned process, the milling treatment and heat treatment were carried out in the same manner as Example No. 1 after adding acetylene black and $Li_2CO_3$ to them. Since the XRD patterns of the products after the heat treatment agreed well with the XRD patterns of the samples prior to the heat treatment, it was possible to ascertain that the lithium-rich silicate-system compounds maintained the crystal structures without ever being decomposed.

Thereafter, coin batteries were prepared in the same manner as Example No. 1, and the charging-discharging characteristics of the respective batteries were measured. The results are shown in Table 11 and Table 12 below. From these results, it is evident that the respective compounds shown in Table 11 and Table 12 below had favorable cyclic characteristics and higher capacities.

TABLE 9

Results of ICP Elemental Analysis

| "M"' | Li | K | Na | Fe | Si | O | Mn | Co | Ni | Nb | Mo | W | Mg | Al |
|---|---|---|---|---|---|---|---|---|---|---|---|---|---|---|
| Mn | 2.08 | 0.02 | 0.01 | 0.9 | 1 | 4.05 | 0.10 | | | | | | | |
| Co | 2.06 | 0.02 | 0.01 | 0.9 | 1 | 4.03 | | 0.10 | | | | | | |
| Ni | 2.07 | 0.02 | 0.01 | 0.9 | 1 | 4.06 | | | 0.10 | | | | | |
| Nb | 2.05 | 0.02 | 0.01 | 0.9 | 1 | 4.11 | | | | 0.10 | | | | |
| Mo | 2.06 | 0.02 | 0.01 | 0.9 | 1 | 4.09 | | | | | 0.10 | | | |
| W | 2.05 | 0.02 | 0.01 | 0.9 | 1 | 4.05 | | | | | | 0.10 | | |
| Mg | 2.07 | 0.02 | 0.01 | 0.9 | 1 | 4.03 | | | | | | | 0.10 | |
| Al | 2.06 | 0.02 | 0.01 | 0.9 | 1 | 4.05 | | | | | | | | 0.10 |

| "M"' | Li | K | Na | Fe | Si | O | Ca | Ti | Cr | Cu | Zn | Zr | V |
|---|---|---|---|---|---|---|---|---|---|---|---|---|---|
| Ca | 2.07 | 0.02 | 0.01 | 0.9 | 1 | 4.07 | 0.10 | | | | | | |
| Ti | 2.05 | 0.02 | 0.01 | 0.9 | 1 | 4.06 | | 0.10 | | | | | |
| Cr | 2.04 | 0.02 | 0.01 | 1.0 | 1 | 4.03 | | | 0.10 | | | | |
| Cu | 2.06 | 0.02 | 0.01 | 0.9 | 1 | 4.05 | | | | 0.10 | | | |
| Zn | 2.07 | 0.02 | 0.01 | 0.9 | 1 | 4.08 | | | | | 0.10 | | |
| Zr | 2.08 | 0.02 | 0.01 | 1.0 | 1 | 4.05 | | | | | | 0.10 | |
| V | 2.05 | 0.02 | 0.01 | 0.9 | 1 | 4.09 | | | | | | | 0.10 |

("M" = Fe, "x" = 0.1, and "y" = 0)

TABLE 10

Results of ICP Elemental Analysis

| "M"' | Li | K | Na | Mn | Si | O | Co | Ni | Nb | Mo | W | Mg | Al |
|---|---|---|---|---|---|---|---|---|---|---|---|---|---|
| Co | 2.03 | 0.01 | 0.01 | 0.9 | 1 | 4.02 | 0.10 | | | | | | |
| Ni | 2.06 | 0.01 | 0.01 | 0.9 | 1 | 4.04 | | 0.10 | | | | | |
| Nb | 2.07 | 0.01 | 0.01 | 0.9 | 1 | 4.08 | | | 0.10 | | | | |
| Mo | 2.05 | 0.01 | 0.01 | 0.9 | 1 | 4.07 | | | | 0.10 | | | |
| W | 2.06 | 0.01 | 0.01 | 0.9 | 1 | 4.06 | | | | | 0.10 | | |
| Mg | 2.08 | 0.01 | 0.01 | 0.9 | 1 | 4.02 | | | | | | 0.10 | |
| Al | 2.07 | 0.01 | 0.01 | 0.9 | 1 | 4.06 | | | | | | | 0.10 |

| "M"' | Li | K | Na | Mn | Si | O | Ca | Ti | Cr | Cu | Zn | Zr | V |
|---|---|---|---|---|---|---|---|---|---|---|---|---|---|
| Ca | 2.04 | 0.01 | 0.01 | 0.9 | 1 | 4.03 | 0.10 | | | | | | |
| Ti | 2.05 | 0.01 | 0.01 | 0.9 | 1 | 4.05 | | 0.10 | | | | | |
| Cr | 2.05 | 0.01 | 0.01 | 1.0 | 1 | 4.03 | | | 0.10 | | | | |
| Cu | 2.07 | 0.01 | 0.01 | 0.9 | 1 | 4.06 | | | | 0.10 | | | |
| Zn | 2.06 | 0.01 | 0.01 | 0.9 | 1 | 4.07 | | | | | 0.10 | | |
| Zr | 2.04 | 0.01 | 0.01 | 1.0 | 1 | 4.03 | | | | | | 0.10 | |
| V | 2.05 | 0.01 | 0.01 | 0.9 | 1 | 4.08 | | | | | | | 0.10 |

("M" = Mn, "x" = 0.1, and "y" = 0)

TABLE 11

| "M'" | Discharging Capacity after 5 Cycles (mAh/g) | Average Voltage (V) | Number of Cycles |
|---|---|---|---|
| Mn | 240 | 2.67 | 50 |
| Co | 230 | 2.76 | 50 |
| Ni | 220 | 2.79 | 50 |
| Nb | 252 | 2.61 | 50 |
| Mo | 251 | 2.55 | 50 |
| W | 250 | 2.58 | 50 |
| Mg | 245 | 2.6 | 50 |
| Al | 243 | 2.58 | 50 |
| Ca | 254 | 2.56 | 50 |
| Ti | 232 | 2.52 | 50 |
| Cr | 243 | 2.54 | 50 |
| Cu | 250 | 2.51 | 50 |
| Zn | 252 | 2.53 | 50 |
| Zr | 246 | 2.56 | 50 |
| V | 250 | 2.59 | 50 |

("M" = Fe, "x" = 0.1, and "y" = 0)

TABLE 12

| "M'" | Discharging Capacity after 5 Cycles (mAh/g) | Average Voltage (V) | Number of Cycles |
|---|---|---|---|
| Co | 220 | 3.39 | 50 |
| Ni | 221 | 3.42 | 50 |
| Nb | 225 | 3.30 | 50 |
| Mo | 222 | 3.28 | 50 |
| W | 226 | 3.25 | 50 |
| Mg | 226 | 3.27 | 50 |
| Al | 224 | 3.24 | 50 |
| Ca | 226 | 3.25 | 50 |
| Ti | 222 | 3.21 | 50 |
| Cr | 223 | 3.23 | 50 |
| Cu | 226 | 3.21 | 50 |
| Zn | 225 | 3.22 | 50 |
| Zr | 220 | 3.25 | 50 |
| V | 221 | 3.27 | 50 |

("M" = Mn, "x" = 0.1, and "y" = 0)

Example No. 4

Fluorine Impartation 50 parts by weight of acetylene black (being represented as "AB" hereinafter) and 20 parts by weight of LiF were added to 100 parts by weight of the products that were obtained after water-soluble substances, such as the carbonate salts, had been removed in Example No. 3. Then, they were subjected to a milling process at a rate of 450 rpm for 5 hours with use of a planetary ball mill (with 5-mm zirconia balls), and were then subjected to a heat treatment at 700° C. for 2 hours in a mixed-gas atmosphere of carbon dioxide and hydrogen (e.g., $CO_2:H_2=100:3$ by molar ratio). Since the XRD patterns of the products after the heat treatment agreed well with the XRD patterns of the samples prior to the heat treatment, it was possible to ascertain that the lithium-rich silicate-system compounds maintained the crystal structures without ever being decomposed. Moreover, the results of the elemental analysis (i.e., elemental molar ratios) that were found by means of an ICP method are shown in Table 13 and Table 14 below. As can be evident from these tables, it was possible to ascertain that the products were all found to be lithium-rich fluorine-containing lithium-silicate-system compounds.

TABLE 13

Results of ICP Elemental Analysis

| "M'" | Li | K | Na | Fe | Si | O | F | Mn | Co | Ni | Nb | Mo | W | Mg | Al |
|---|---|---|---|---|---|---|---|---|---|---|---|---|---|---|---|
| Mn | 2.07 | 0.02 | 0.01 | 0.9 | 1 | 4.04 | 0.2 | 0.10 | | | | | | | |
| Co | 2.05 | 0.02 | 0.01 | 0.9 | 1 | 4.03 | 0.2 | | 0.10 | | | | | | |
| Ni | 2.07 | 0.02 | 0.01 | 0.9 | 1 | 4.05 | 0.2 | | | 0.10 | | | | | |
| Nb | 2.06 | 0.02 | 0.01 | 0.9 | 1 | 4.08 | 0.2 | | | | 0.10 | | | | |
| Mo | 2.04 | 0.02 | 0.01 | 0.9 | 1 | 4.07 | 0.2 | | | | | 0.10 | | | |
| W | 2.05 | 0.02 | 0.01 | 0.9 | 1 | 4.05 | 0.2 | | | | | | 0.10 | | |
| Mg | 2.04 | 0.02 | 0.01 | 0.9 | 1 | 4.04 | 0.2 | | | | | | | 0.10 | |
| Al | 2.06 | 0.02 | 0.01 | 0.9 | 1 | 4.06 | 0.2 | | | | | | | | 0.10 |

| "M'" | Li | K | Na | Fe | Si | O | F | Ca | Ti | Cr | Cu | Zn | Zr | V |
|---|---|---|---|---|---|---|---|---|---|---|---|---|---|
| Ca | 2.08 | 0.02 | 0.01 | 0.9 | 1 | 4.07 | 0.2 | 0.10 | | | | | | |
| Ti | 2.06 | 0.02 | 0.01 | 0.9 | 1 | 4.03 | 0.2 | | 0.10 | | | | | |
| Cr | 2.07 | 0.02 | 0.01 | 0.9 | 1 | 4.05 | 0.2 | | | 0.10 | | | | |
| Cu | 2.04 | 0.02 | 0.01 | 0.9 | 1 | 4.06 | 0.2 | | | | 0.10 | | | |
| Zn | 2.03 | 0.02 | 0.01 | 0.9 | 1 | 4.07 | 0.2 | | | | | 0.10 | | |
| Zr | 2.04 | 0.02 | 0.01 | 1.0 | 1 | 4.05 | 0.2 | | | | | | 0.10 | |
| V | 2.05 | 0.02 | 0.01 | 0.9 | 1 | 4.06 | 0.2 | | | | | | | 0.10 |

("M" = Fe, "x" = 0.1, and "y" = 0.1)

TABLE 14

Results of ICP Elemental Analysis

| "M'" | Li | K | Na | Mn | Si | O | F | Co | Ni | Nb | Mo | W | Mg | Al |
|---|---|---|---|---|---|---|---|---|---|---|---|---|---|---|
| Co | 2.04 | 0.01 | 0.01 | 0.9 | 1 | 4.02 | 0.2 | 0.10 | | | | | | |
| Ni | 2.05 | 0.01 | 0.01 | 0.9 | 1 | 4.03 | 0.2 | | 0.10 | | | | | |
| Nb | 2.06 | 0.01 | 0.01 | 1.0 | 1 | 4.07 | 0.2 | | | 0.10 | | | | |
| Mo | 2.04 | 0.01 | 0.01 | 0.9 | 1 | 4.06 | 0.2 | | | | 0.10 | | | |

TABLE 14-continued

Results of ICP Elemental Analysis

| | | | | | | | | | | | | | |
|---|---|---|---|---|---|---|---|---|---|---|---|---|---|
| W  | 2.03 | 0.01 | 0.01 | 0.9 | 1 | 4.08 | 0.2 | | | 0.10 | | | |
| Mg | 2.04 | 0.01 | 0.01 | 0.9 | 1 | 4.03 | 0.2 | | | | 0.10 | | |
| Al | 2.05 | 0.01 | 0.01 | 0.9 | 1 | 4.04 | 0.2 | | | | | 0.10 | |

| "M'" | Li | K | Na | Mn | Si | O | F | Ca | Ti | Cr | Cu | Zn | Zr | V |
|---|---|---|---|---|---|---|---|---|---|---|---|---|---|---|
| Ca | 2.07 | 0.01 | 0.01 | 0.9 | 1 | 4.05 | 0.2 | 0.10 | | | | | | |
| Ti | 2.07 | 0.02 | 0.01 | 0.9 | 1 | 4.05 | 0.2 | | 0.10 | | | | | |
| Cr | 2.05 | 0.02 | 0.01 | 0.9 | 1 | 4.04 | 0.2 | | | 0.10 | | | | |
| Cu | 2.03 | 0.02 | 0.01 | 0.9 | 1 | 4.02 | 0.2 | | | | 0.10 | | | |
| Zn | 2.06 | 0.02 | 0.01 | 0.9 | 1 | 4.03 | 0.2 | | | | | 0.10 | | |
| Zr | 2.03 | 0.02 | 0.01 | 1.0 | 1 | 4.06 | 0.2 | | | | | | 0.10 | |
| V  | 2.04 | 0.02 | 0.01 | 0.9 | 1 | 4.05 | 0.2 | | | | | | | 0.10 |

("M" = Mn, "x" = 0.1, and "y" = 0.1)

Thereafter, coin batteries were prepared in the same manner as Example No. 1, and the charging-discharging characteristics of the respective batteries were measured. The results are shown in Table 15 and Table 16 below. From these results, it was possible to ascertain that the respective compounds were those which had favorable cyclic characteristics and higher capacities, and especially that the average voltages rose because of the fact that fluorine was added.

TABLE 15

| "M'" | Discharging Capacity after 5 Cycles (mAh/g) | Average Voltage (V) | Number of Cycles |
|---|---|---|---|
| Mn | 241 | 2.78 | 50 |
| Co | 232 | 2.77 | 50 |
| Ni | 225 | 2.79 | 50 |
| Nb | 250 | 2.71 | 50 |
| Mo | 245 | 2.72 | 50 |
| W  | 250 | 2.81 | 50 |
| Mg | 252 | 2.78 | 50 |
| Al | 243 | 2.76 | 50 |
| Ca | 256 | 2.74 | 50 |
| Ti | 234 | 2.63 | 50 |
| Cr | 235 | 2.65 | 50 |
| Cu | 225 | 2.61 | 50 |
| Zn | 227 | 2.67 | 50 |
| Zr | 229 | 2.68 | 50 |
| V  | 232 | 2.63 | 50 |

("M" = Fe, "x" = 0.1, and "y" = 0)

TABLE 16

| "M'" | Discharging Capacity after 5 Cycles (mAh/g) | Average Voltage (V) | Number of Cycles |
|---|---|---|---|
| Co | 222 | 3.52 | 50 |
| Ni | 223 | 3.53 | 50 |
| Nb | 225 | 3.48 | 50 |
| Mo | 228 | 3.46 | 50 |
| W  | 227 | 3.43 | 50 |
| Mg | 225 | 3.45 | 50 |
| Al | 224 | 3.42 | 50 |
| Ca | 223 | 3.47 | 50 |
| Ti | 225 | 3.41 | 50 |
| Cr | 224 | 3.42 | 50 |
| Cu | 225 | 3.44 | 50 |
| Zn | 221 | 3.40 | 50 |
| Zr | 223 | 3.45 | 50 |
| V  | 224 | 3.41 | 50 |

("M" = Mn, "x" = 0.1, and "y" = 0)

The invention claimed is:

1. A production process for lithium-silicate-system compound, comprising:
   reacting a lithium-silicate compound being expressed by $Li_2SiO_3$ with a substance comprising at least one member of transition-metal elements that is selected from the group consisting of iron and manganese at 400-650° C. in a molten salt of a carbonate mixture comprising lithium carbonate and at least one member of alkali-metal carbonates that is selected from the group consisting of potassium carbonate, sodium carbonate, rubidium carbonate and cesium carbonate in a mixed-gas atmosphere including carbon dioxide and a reducing gas.

2. The production process for the lithium-silicate-system compound as set forth in claim 1, wherein the substance including transition-metal element is one which comprises:
   at least one member of transition-metal elements that is selected from the group consisting of iron and manganese in an amount of from 50 to 100% by mol; and
   at least one member of metallic elements that is selected from the group consisting of Mg, Ca, Co, Al, Ni, Nb, Ti, Cr, Cu, Zn, Zr, V, Mo and W in an amount of from 0 to 50% by mol;
   when a summed amount of all metallic elements being included in the substance is taken as 100% by mol.

3. A production process for lithium-silicate-system compound, the production process including a step of removing the alkali-metal carbonate, which is used as a flux, by means of a solvent, after producing a lithium-silicate-system compound by the process according to claim 1.

4. The production process for lithium-silicate-system compound as set forth in claim 1, wherein a lithium-silicate-system compound to be formed is a compound being expressed by a compositional formula:

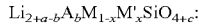

$$Li_{2+a-b}A_bM_{1-x}M'_xSiO_{4+c}:$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
   $0 \leq x \leq 0.5$;
   $0 < a < 1$;
   $0 < b < 0.2$; and
   $0 < c < 0.3$;

in the formula.

5. A production process for lithium-silicate-system compound whose electrical conductivity is upgraded, the production process being characterized in that:
a heat treatment is carried out in a reducing atmosphere after adding a carbonaceous material and $Li_2CO_3$ to a lithium-silicate-system compound being obtained by the process according to claim 1 and then mixing them by means of ball mill until they turn into being amorphous.

6. A positive-electrode active material for lithium-ion secondary battery, the positive-electrode active material comprising a lithium-silicate-system compound that is obtained by means of the process according to claim 5,
wherein the lithium-silicate-system compound is expressed by the following compositional formula:

$$Li_{2+a-b}A_bM_{1-x}M'_xSiO_{4+c}$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$; and
$0 < c < 0.3$.

7. A positive-electrode active material for lithium-ion secondary battery, the positive-electrode active material comprising a lithium-silicate-system compound that is obtainable by carrying out charging with use of a lithium-silicate-system compound that is obtained by means of the process according claim 5 as a positive-electrode active material for lithium-ion secondary battery,
wherein the lithium-silicate-system compound is expressed by the following compositional formula:

$$Li_{2+a-b}A_bM_{1-x}M'_xSiO_{4+c}$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$; and
$0 < c < 0.3$.

8. The positive-electrode active material for lithium-ion secondary battery as set forth in claim 7, wherein the lithium-silicate-system compound that is obtainable by carrying out charging is a compound under a condition of being charged up to 4.2 V when lithium metal serves as a negative electrode, the compound being expressed by a compositional formula:

$$Li_{1+a-b}A_bFeSiO_{4+c}:$$

where "A" is at least one element that is selected from the group consisting of Na, K, Rb and Cs; and
the respective subscripts are specified as follows:
$0 < "a" < 1$;
$0 < "b" < 0.2$; and
$0 < "c" < 0.3$;

in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 10.10-degree diffraction angle;
the second peak at and around 16.06-degree diffraction angle;
the third peak at and around 9.8-degree diffraction angle;
the fourth peak at and around 14.54-degree diffraction angle; and
the fifth peak at and around 15.50-degree diffraction angle.

9. The positive-electrode active material for lithium-ion secondary battery as set forth in claim 7, wherein the lithium-silicate-system compound that is obtainable by carrying out charging is a compound under a condition of being charged up to 4.2 V when lithium metal serves as a negative electrode, the compound being expressed by a compositional formula:

$$Li_{1+a-b}A_bMnSiO_{4+c}$$

where "A" is at least one element that is selected from the group consisting of Na, K, Rb and Cs; and
the respective subscripts are specified as follows:
$0 < "a" < 1$;
$0 < "b" < 0.2$; and
$0 < "c" < 0.3$;

in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 8.15-degree diffraction angle;
the second peak at and around 11.60-degree diffraction angle;
the third peak at and around 17.17-degree diffraction angle;
the fourth peak at and around 11.04-degree diffraction angle; and
the fifth peak at and around 19.87-degree diffraction angle.

10. A positive-electrode active material for lithium-ion secondary battery, the positive-electrode active material comprising a lithium-silicate-system compound that is obtainable by doing discharging after doing charging with use of a lithium-silicate-system compound that is obtained by means of the process according to claim 5 as a positive-electrode active material for lithium-ion secondary battery,
wherein the lithium-silicate-system compound is expressed by the following compositional formula:

$$Li_{2+a-b}A_bM_{1-x}M'_xSiO_{4+c}$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$; and
$0 < c < 0.3$.

11. The positive-electrode active material for lithium-ion secondary battery as set forth in claim 10, wherein the lithium-silicate-system compound that is obtainable by doing discharging is a compound under a condition of being discharged down to 1.5 V when lithium metal serves as a negative electrode, the compound being expressed by a compositional formula:

$$Li_{2+a-b}A_bFeSiO_{4+c}:$$

where "A" is at least one element that is selected from the group consisting of Na, K, Rb and Cs; and
the respective subscripts are specified as follows:
0<"a"<1;
0<"b"<0.2; and
0<"c"<0.3;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 16.07-degree diffraction angle;
the second peak at and around 14.92-degree diffraction angle;
the third peak at and around 10.30-degree diffraction angle;
the fourth peak at and around 9.82-degree diffraction angle; and
the fifth peak at and around 21.98-degree diffraction angle.

12. The positive-electrode active material for lithium-ion secondary battery as set forth in claim 10, wherein the lithium-silicate-system compound that is obtainable by doing discharging is a compound under a condition of being discharged down to 1.5 V when lithium metal serves as a negative electrode, the compound being expressed by a compositional formula:

$$Li_{2+a-b}A_bMnSiO_{4+c}:$$

where "A" is at least one element that is selected from the group consisting of Na, K, Rb and Cs; and
the respective subscripts are specified as follows:
0<"a"<1;
0<"b"<0.2; and
0<"c"<0.3;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 8.16-degree diffraction angle;
the second peak at and around 11.53-degree diffraction angle;
the third peak at and around 11.66-degree diffraction angle;
the fourth peak at and around 11.03-degree diffraction angle; and
the fifth peak at and around 11.35-degree diffraction angle.

13. A positive electrode for lithium secondary battery, the positive electrode including a lithium-silicate-system compound that is obtained by means of the process according to claim 5 as an active material,
wherein the lithium-silicate-system compound is expressed by the following compositional formula:

$$Li_{2+a-b}A_bM_{1-x}M'_xSiO_{4+c}$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
0≤x≤0.5;
0<a<1;
0<b<0.2; and
0<c<0.3.

14. A lithium secondary battery including the positive electrode as set forth in claim 13 as a constituent element.

15. A production process for fluorine-containing lithium-silicate-system compound that is expressed by a compositional formula:

$$Li_{2+a-b}A_bM_{1-x}M'_xSiO_{4+c-y}F_{2y}:$$

where "A" is at least one element that is selected from the group consisting of Na, K, Rb and Cs;
"M" is Fe or Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
0≤x≤0.5;
0<a<1;
0<b<0.2;
0<c<0.3; and
0<y<1;
in the formula;
the production process being characterized in that:
a heat treatment is carried out in a reducing atmosphere after adding a carbonaceous material and LiF to a lithium-silicate-system compound being obtained by the process according to claim 1 and then mixing them by means of ball mill until they turn into being amorphous.

16. A positive-electrode active material for lithium-ion secondary battery, the positive-electrode active material comprising a lithium-silicate-system compound that is obtained by means of the process according claim 15,
wherein the fluorine-containing lithium-silicate-system compound is expressed by the compositional formula:

$$Li_{2+a-b}A_bM_{1-x}M'_xSiO_{4+c-y}F_{2y}:$$

where "A" is at least one element that is selected from the group consisting of Na, K, Rb and Cs:
"M" is Fe or Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
0≤x≤0.5;
0<a<1;
0<b<0.2;
0<c<0.3; and
0<y<1.

17. A positive-electrode active material for lithium-ion secondary battery, the positive-electrode active material comprising a lithium-silicate-system compound that is obtainable by carrying out charging with use of a lithium-silicate-system compound that is obtained by means of the process according to claim 15 as a positive-electrode active material for lithium-ion secondary battery, wherein the fluorine-containing lithium-silicate-system compound is expressed by the compositional formula:

$$Li_{2+a-b}A_bM_{1-x}M'_xSiO_{4+c-y}F_{2y}:$$

where "A" is at least one element that is selected from the group consisting of Na, K, Rb and Cs:
"M" is Fe or Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$;
$0 < c < 0.3$; and
$0 < y < 1$.

18. A positive-electrode active material for lithium-ion secondary battery, the positive-electrode active material comprising a lithium-silicate-system compound that is obtainable by doing discharging after doing charging with use of a lithium-silicate-system compound that is obtained by means of the process according to claim 15 as a positive-electrode active material for lithium-ion secondary battery,
wherein $0<"b"<0.2$.

19. A positive electrode for lithium secondary battery, the positive electrode including a lithium-silicate-system compound that is obtained by means of the process according to claim 15 as an active material,
wherein the fluorine-containing lithium-silicate-system compound is expressed by the compositional formula: $Li_{2+a-b}A_bM_{1-x}M'_xSiO_{4+c-y}F_{2y}:$
where "A" is at least one element that is selected from the group consisting of Na, K, Rb and Cs:
"M" is Fe or Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$;
$0 < c < 0.3$; and
$0 < y < 1$.

20. A lithium secondary battery including the positive electrode as set forth in claim 19 as a constituent element.

21. A positive-electrode active material for lithium-ion secondary battery, the positive-electrode active material comprising a lithium-silicate-system compound that is obtained by means of the process according to claim 1,
wherein the lithium-silicate-system compound is expressed by the following compositional formula:
$Li_{2+a-b}A_bM_{1-x}M'_xSiO_{4+c}$
where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$; and
$0 < c < 0.3$.

22. A positive-electrode active material for lithium-ion secondary battery, the positive-electrode active material comprising a lithium-silicate-system compound that is obtainable by carrying out charging with use of a lithium-silicate-system compound that is obtained by means of the process according to claim 1 as a positive-electrode active material for lithium-ion secondary battery,
wherein the lithium-silicate-system compound is expressed by the following compositional formula:

$$Li_{2+a-b}A_bM_{1-x}M'_xSiO_{4+c}$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$; and
$0 < c < 0.3$.

23. The positive-electrode active material for lithium-ion secondary battery as set forth in claim 22, wherein the lithium-silicate-system compound that is obtainable by carrying out charging is a compound under a condition of being charged up to 4.2 V when lithium metal serves as a negative electrode, the compound being expressed by a compositional formula:

$$Li_{1+a-b}A_bFeSiO_{4+c}:$$

where "A" is at least one element that is selected from the group consisting of Na, K, Rb and Cs; and
the respective subscripts are specified as follows:
$0<"a"<1$;
$0<"b"<0.2$; and
$0<"c"<0.3$;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 10.10 degrees;
the second peak at and around 16.06 degrees;
the third peak at and around 9.8 degrees;
the fourth peak at and around 14.54 degrees; and
the fifth peak at and around 15.50 degrees.

24. The positive-electrode active material for lithium-ion secondary battery as set forth in claim 22, wherein the lithium-silicate-system compound that is obtainable by carrying out charging is a compound under a condition of being charged up to 4.2 V when lithium metal serves as a negative electrode, the compound being expressed by a compositional formula:

$$Li_{1+a-b}A_bMnSiO_{4+c}$$

where "A" is at least one element that is selected from the group consisting of Na, K, Rb and Cs; and
the respective subscripts are specified as follows:
$0<"a"<1$;
$0<"b"<0.2$; and
$0<"c"<0.3$;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 8.15-degree diffraction angle;
the second peak at and around 11.60-degree diffraction angle;
the third peak at and around 17.17-degree diffraction angle;
the fourth peak at and around 11.04-degree diffraction angle; and
the fifth peak at and around 19.87-degree diffraction angle.

25. A positive-electrode active material for lithium-ion secondary battery, the positive-electrode active material comprising a lithium-silicate-system compound that is obtainable by doing discharging after doing charging with use of a lithium-silicate-system compound that is obtained by means of the process according to claim 1 as a positive-electrode active material for lithium-ion secondary battery,
wherein the lithium-silicate-system compound is expressed by the following compositional formula:

$$Li_{2+a-b}A_bM_{1-x}M'_xSiO_{4+c}$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$; and
$0 < c < 0.3$.

26. The positive-electrode active material for lithium-ion secondary battery as set forth in claim 25, wherein the lithium-silicate-system compound that is obtainable by doing discharging is a compound under a condition of being discharged down to 1.5 V when lithium metal serves as a negative electrode, the compound being expressed by a compositional formula:

$$Li_{2+a-b}A_bFeSiO_{4+c}:$$

where "A" is at least one element that is selected from the group consisting of Na, K, Rb and Cs; and
the respective subscripts are specified as follows:
$0<"a"<1$;
$0<"b"<0.2$; and
$0<"c"<0.3$;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 16.07-degree diffraction angle;
the second peak at and around 14.92-degree diffraction angle;
the third peak at and around 10.30-degree diffraction angle;
the fourth peak at and around 9.82-degree diffraction angle; and
the fifth peak at and around 21.98-degree diffraction angle.

27. The positive-electrode active material for lithium-ion secondary battery as set forth in claim 25, wherein the lithium-silicate-system compound that is obtainable by doing discharging is a compound under a condition of being discharged down to 1.5 V when lithium metal serves as a negative electrode, the compound being expressed by a compositional formula:

$$Li_{2+a-b}A_bMnSiO_{4+c}$$

where "A" is at least one element that is selected from the group consisting of Na, K, Rb and Cs; and
the respective subscripts are specified as follows:
$0<"a"<1$;
$0<"b"<0.2$; and
$0<"c"<0.3$;
in the formula; and
the compound exhibiting a first peak through a fifth peak in the vicinity of diffraction angles (2θ) that are set forth below when the diffraction angles fall in a range of from 5 degrees to 40 degrees in a case of being subjected to an X-ray diffraction measurement with use of an X-ray whose wavelength is 0.7 Å:
the first peak at and around 8.16-degree diffraction angle;
the second peak at and around 11.53-degree diffraction angle;
the third peak at and around 11.66-degree diffraction angle;
the fourth peak at and around 11.03-degree diffraction angle; and
the fifth peak at and around 11.35-degree diffraction angle.

28. A positive electrode for lithium secondary battery, the positive electrode including a lithium-silicate-system compound that is obtained by means of the process according to claim 1 as an active material,
wherein the lithium-silicate-system compound is expressed by the following compositional formula:

$$Li_{2+a-b}A_bM_{1-x}M'_xSiO_{4+c}$$

where "A" is at least one element that is selected from the group consisting of Na, K, Rb and Cs;
"M" is at least one element that is selected from the group consisting of Fe and Mn;
"M'" is at least one element that is selected from the group consisting of Mg, Ca, Co, Al, Ni, Nb, Ti, Cr, Cu, Zn, Zr, V, Mo and W; and
the respective subscripts are specified as follows:
$0 \leq x \leq 0.5$;
$0 < a < 1$;
$0 < b < 0.2$; and
$0 < c < 0.3$.

29. A lithium secondary battery including the positive electrode as set forth in claim 28 as a constituent element.

* * * * *